United States Patent
Yin

(10) Patent No.: US 12,069,667 B2
(45) Date of Patent: Aug. 20, 2024

(54) METHODS TO DETERMINE THE URLLC UCI MULTIPLEXING LOCATION ON EMBB PUSCH

(71) Applicants: SHARP KABUSHIKI KAISHA, Sakai (JP); FG Innovation Company Limited, Tuen Mun (HK)

(72) Inventor: Zhanping Yin, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 397 days.

(21) Appl. No.: 17/440,003

(22) PCT Filed: Mar. 24, 2020

(86) PCT No.: PCT/JP2020/013107
§ 371 (c)(1),
(2) Date: Sep. 16, 2021

(87) PCT Pub. No.: WO2020/196548
PCT Pub. Date: Oct. 1, 2020

(65) Prior Publication Data
US 2022/0174661 A1   Jun. 2, 2022

Related U.S. Application Data

(60) Provisional application No. 62/823,402, filed on Mar. 25, 2019.

(51) Int. Cl.
*H04W 72/21* (2023.01)
*H04L 5/00* (2006.01)

(52) U.S. Cl.
CPC .......... *H04W 72/21* (2023.01); *H04L 5/0012* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2018/0279291 A1* | 9/2018 | Tiirola | H04L 25/0224 |
| 2020/0228173 A1* | 7/2020 | Ye | H04L 5/0055 |
| 2020/0404692 A1* | 12/2020 | Yin | H04L 1/1887 |
| 2021/0058922 A1* | 2/2021 | Han | H04L 5/0055 |
| 2022/0174661 A1* | 6/2022 | Yin | H04L 5/0091 |
| 2022/0295521 A1* | 9/2022 | Gou | H04W 72/569 |
| 2023/0388076 A1* | 11/2023 | Yokomakura | H04L 5/0048 |

OTHER PUBLICATIONS

Intel Corporation, "On enhancements to intra-UE multiplexing for IIoT", R1-1902499, 3GPP TSG RAN WG1 Meeting#96, Athens, Greece, Feb. 25-Mar. 1, 2019.
Huawei et al., "UCI enhancements for URLLC", R1-1901558, 3GPP TSG RAN WG1 Meeting #96, Athens, Greece, Feb. 25-Mar. 1, 2019.

* cited by examiner

*Primary Examiner* — Hassan A Phillips
*Assistant Examiner* — Gautam Sharma
(74) *Attorney, Agent, or Firm* — ScienBiziP, P.C.

(57) ABSTRACT

A user equipment (UE) is described. The UE includes a higher layer processor configured to determine a multiplexing location of an ultra-reliable low-latency communication (URLLC) uplink control information (UCI) on an enhanced mobile broadband (eMBB) physical uplink shared channel (PUSCH). The UE also includes transmitting circuitry configured to perform multiplexing of the URLLC UCI on the eMBB PUSCH.

18 Claims, 21 Drawing Sheets

//]::]::]::]::]:: # METHODS TO DETERMINE THE URLLC UCI MULTIPLEXING LOCATION ON EMBB PUSCH

CROSS-REFERENCE TO RELATED APPLICATION

This Nonprovisional application claims priority under 35 U.S.C. § 119 on provisional Application No. 62/823,402 on Mar. 25 2019, the entire contents of which are hereby incorporated by reference.

TECHNICAL FIELD

The present disclosure relates generally to communication systems. More specifically, the present disclosure relates to methods to determine the ultra-reliable low-latency communication (URLLC) uplink control information (UCI) multiplexing location on enhanced mobile broadband (eMBB) physical uplink shared channel (PUSCH).

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a higher layer processor configured to determine a multiplexing location of an ultra-reliable low-latency communication (URLLC) uplink control information (UCI) on an enhanced mobile broadband (eMBB) physical uplink shared channel (PUSCH); and transmitting circuitry configured to perform multiplexing of the URLLC UCI on the eMBB PUSCH.

In one example, a base station (gNB), comprising: a higher layer processor configured to determine a multiplexing location of an ultra-reliable low-latency communication (URLLC) uplink control information (UCI) on an enhanced mobile broadband (eMBB) physical uplink shared channel (PUSCH); and receiving circuitry configured to receive multiplexing of the URLLC UCI on the eMBB PUSCH.

DESCRIPTION OF EMBODIMENTS

Figure 1:
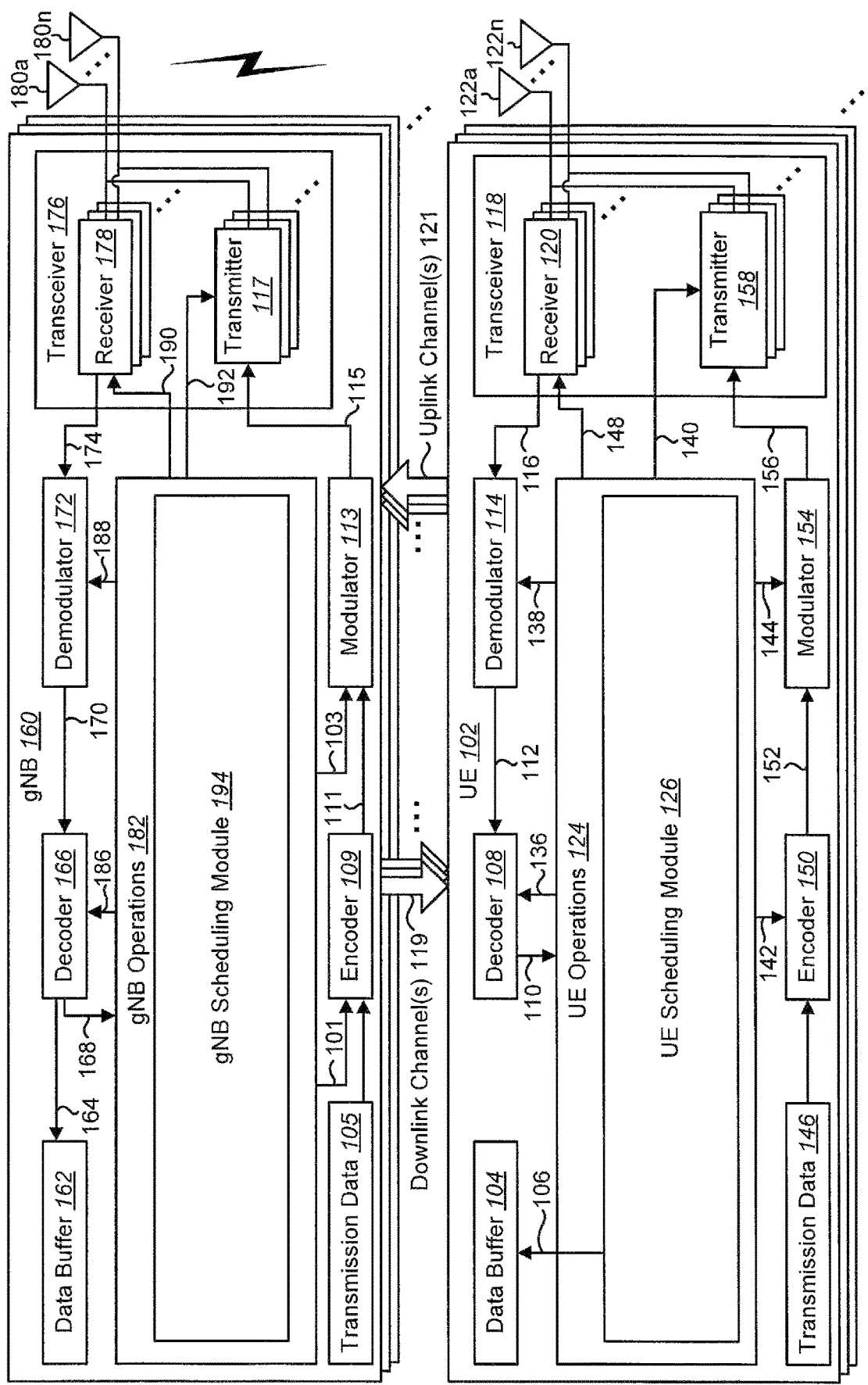
FIG. 1 is a block diagram illustrating one implementation of one or more base stations (gNBs) and one or more user equipments (UEs) in which systems and methods for determining the ultra-reliable low-latency communication (URLLC) uplink control information (UCI) multiplexing location on enhanced mobile broadband (eMBB) physical uplink shared channel (PUSCH) may be implemented.

A user equipment (UE) is described. The UE includes a higher layer processor configured to determine an ultra-reliable low-latency communication (URLLC) uplink control information (UCI) multiplexing location on an enhanced mobile broadband (eMBB) physical uplink shared channel (PUSCH). The UE also includes transmitting circuitry configured to perform multiplexing of the URLLC UCI on the eMBB PUSCH.

In an approach, the URLLC UCI multiplexing may start from a starting symbol in an overlapping region between the URLLC PUCCH and the eMBB PUSCH. In another approach, the URLLC UCI multiplexing may start from a starting symbol in an overlapping region between a sub-slot containing the URLLC PUCCH and the eMBB PUSCH.

If a demodulation reference signal (DMRS) symbol is contained in an overlapping region, then the URLLC UCI is not multiplexed on the DMRS. The URLLC UCI multiplexing may be limited within overlapping symbols. The URLLC UCI multiplexing may be extended beyond overlapping symbols. A delay tolerance may be specified to limit a feedback delay of the URLLC UCI.

In another approach, the URLLC UCI multiplexing starts only after a DMRS symbol. The URLLC UCI multiplexing may start after any DMRS(s) including additional DMRS(s), and the DMRS(s) may or may not be a first continuous set of DMRS in a slot or in a hop in the case of frequency hopping. The URLLC UCI multiplexing may be performed in one continuous set of symbols only. No UCI segmentation is performed. UCI multiplexing may be performed in only one hop even if frequency hopping is configured.

A base station (gNB) is also described. The gNB includes a higher layer processor configured to determine an URLLC UCI multiplexing location on an eMBB PUSCH. The gNB also includes receiving circuitry configured to receive multiplexing of the URLLC UCI on the eMBB PUSCH.

A method by a UE is also described. The method includes determining an URLLC UCI multiplexing location on an eMBB PUSCH. The method also includes performing multiplexing of the URLLC UCI on the eMBB PUSCH.

A method by a gNB is also described. The method includes determining an URLLC UCI multiplexing location on an eMBB PUSCH. The method also includes receiving multiplexing of the URLLC UCI on the eMBB PUSCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NW" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In 5G NR, different services can be supported with different quality of service (QoS) requirements (e.g., reliability and delay tolerance). For example, eMBB may be targeted for high data rate, and URLLC may be used for ultra-reliability and low latency. To provide ultra-reliability for URLLC traffic, the HARQ-ACK of a URLLC PDSCH transmission may have much higher reliability than the HARQ-ACK feedback of eMBB. Furthermore, URLLC HARQ-ACK feedback may have much shorter processing time and feedback timing than eMBB. Therefore, the current HARQ-ACK multiplexing method on PUSCH may not be suitable for URLLC HARQ-ACK reporting on eMBB PUSCH.

Methods for collision handling between URLLC PUCCH and eMBB PUSCH are described herein. Methods to determine the UCI multiplexing location in the case of URLLC UCI on eMBB PUSCH are also described herein.

Currently, UCI multiplexing is supported under some timing requirements. Other cases where the timing requirements cannot be satisfied are treated as error case, and no UE behavior is defined.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) and one or more user equipments (UEs) in which systems and methods for determining the ultra-reliable low-latency communication (URLLC) uplink control information (UCI) multiplexing location on enhanced mobile broadband (eMBB) physical uplink shared channel (PUSCH) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform PUCCH and PUSCH configuration as described herein. For overlapping URLLC PUCCH and eMBB PUSCH transmission, URLLC uplink control information (UCI) multiplexing on eMBB PUSCH may be supported. In an example, URLLC UCI multiplexing on eMBB PUSCH may be useful if simultaneous PUCCH and PUSCH transmission is not configured or not supported.

Regarding collision handling and conditions for URLLC UCI multiplexing on eMBB PUSCH, both URLLC UCI multiplexing on eMBB PUSCH and channel priority may be supported. The conditions for URLLC UCI multiplexing on eMBB PUSCH may be defined. If UCI multiplexing conditions cannot be satisfied, a channel priority rule may be specified so that the URLLC PUCCH is transmitted and the eMBB PUSCH may be punctured or dropped at least in overlapping symbols between the URLLC PUCCH and eMBB PUSCH.

The conditions to support URLLC UCI on eMBB PUSCH may depend on the methods to determine the staring symbol for URLLC UCI multiplexing on eMBB PUSCH. If UCI multiplexing starts from overlapping symbols between PUCCH and eMBB PUSCH (referred to as Approach 1), or between the sub-slot containing the URLLC PUCCH and the eMBB PUSCH (referred to as Approach 2), UCI multiplexing may not be supported under the following conditions: all overlapping symbols are demodulation reference signal (DMRS) symbols; the resource elements (REs) in the overlapping region are not enough to carry the UCI.

If UCI multiplexing only starts after a DMRS, the timing conditions may be evaluated to determine the potential UCI multiplexing region. If there is no symbol in the potential UCI multiplexing region immediately after a DMRS, URLLC UCI multiplexing on eMBB PUSCH may not be supported. The timing conditions may include some of or all of the following: processing time, PDSCH to HARQ-ACK indication, delay tolerance, PUCCH configurations, sub-slot structures, etc.

Regarding methods to determine the URLLC UCI multiplexing location on eMBB PUSCH, for URLLC UCI multiplexing on eMBB PUSCH, several approaches are proposed. In some examples, these methods may be used to determine the starting symbol for UCI multiplexing and the potential UCI multiplexing region.

In a first approach (Approach 1), UCI is multiplexed on overlapping symbols between the URLLC PUCCH and the eMBB PUSCH. In a second approach (Approach 2), UCI is multiplexed on overlapping symbols between the sub-slot containing the URLLC PUCCH and the eMBB PUSCH. To summarize Approach 1 and 2, UCI multiplexing may start from overlapping symbols between PUCCH and eMBB PUSCH (Approach 1), or between the sub-slot containing the URLLC PUCCH and the eMBB PUSCH (Approach 2). If DMRS is contained in the overlapping region, UCI is not multiplexing on DMRS. The UCI multiplexing may be limited within the overlapping symbols. The UCI multiplexing may be extended beyond the overlapping symbols. A delay tolerance may be specified to limit the UCI feedback delay.

In a third approach (Approach 3), UCI may be multiplexed from a symbol that is immediately after a DMRS if the timing requirements are satisfied. In the case of a collision between URLLC PUCCH and eMBB PUSCH, for UCI multiplexing on eMBB PUSCH, the timing conditions may be evaluated on each set of continuous DMRS(s) of the PUSCH. The earliest DMRS(s) that satisfied the timing requirement may be used to perform UCI multiplexing.

In another aspect of Approach 3, any DMRS(s) in the eMBB PUSCH may be used for URLLC UCI multiplexing on eMBB PUSCH. It does not need to be the first continuous set of DMRS in a slot or in a hop in the case of frequency hopping. In the case that additional DMRS in eMBB PUSCH is configured, the additional DMRS may also be used, and UCI multiplexing may start immediately after an additional DMRS.

In yet another aspect of Approach 3, UCI multiplexing may be performed in one set of symbols only. No UCI segmentation is performed even if frequency hopping is configured. If frequency hopping is configured, the UCI multiplexing may be performed in only one hop. For example, if the URLLC PUCCH collides only in the second hop of the eMBB PUSCH, there is no way the URLLC UCI can be multiplexed on the first hop of the eMBB PUSCH. On the contrary, the URLLC PUCCH may collide in the first hop of an eMBB PUSCH, the UCI may not be multiplexed to the second hop due to ultra-low latency requirements.

Regarding UCI multiplexing on PUSCH in NR Release-15 (Rel-15), uplink control information (UCI) may include HARQ-ACK and CSI. The PUCCH resources for periodic CSI may be configured semi-statically. The PUCCH resource sets for HARQ-ACK may be configured by higher layer signaling, and the PUCCH resource for HARQ-ACK reporting may be determined by explicit signaling with HARQ-ACK resource indication (ARI) bits in the DCI format.

If a PUCCH resource for UCI transmission overlaps with a scheduled PUSCH transmission in time, a collision occurs. In Rel-15, simultaneous PUCCH and PUSCH transmission is not supported. Thus, UCI multiplexing is supported under certain conditions of timing requirements. In a case that the timing requirements are not satisfied, the case is treated as an error case, no specific UE behavior is defined, and it is up to UE implementation to handle it.

Different beta offset values may be configured for different types of UCI (e.g., HARQ-ACK, CSI part 1 and CSI part 2). The number of REs used for the UCI multiplexing may be calculated based on the UCI payload, the beta offset value and the parameters of the PUSCH where the UCI is multiplexed on.

For UCI multiplexing on PUSCH, different behaviors may be defined based on the UCI type and payload sizes. In a first case, UCI carrying HARQ-ACK feedback with 1 or 2 bits may be multiplexed by puncturing PUSCH. The REs for up to 2 bits of HARQ-ACK may be reserved with a distributed RE mapping assuming 2 bits of HARQ-ACK. In all other cases, UCI (more than 2 bits of HARQ-ACK, or a CSI) is multiplexed by rate matching on the PUSCH.

Furthermore, if frequency hopping is configured for the PUSCH, the UCI can be multiplexed on both hops after the first set of DMRS(s) in each hop. If frequency hopping is not configured, the UCI may be multiplexed after the first set of DMRS(s).

The number of DMRS(s) in a PUSCH may depend on the PUSCH duration, PUSCH mapping types, the DMRS configuration types, single-symbol DMRS or double symbol DMRS, etc. For example, for PUSCH DMRS positions within a slot for single-symbol DMRS and intra-slot frequency hopping disabled, configured, the number of DMRS in a slot ranges from 1 to 4 depending on the PUSCH duration. If intra-slot frequency hopping is enabled, 1 or 2 DMRS may be present depending on the duration of a hop.

The UCI multiplexing on PUSCH in Rel-15 may start after the first continuous set of DMRS in a slot in the case that intra-slot frequency hopping is disabled. For HARQ-ACK and CSI part 1, the UCI may be segmented, and UCI multiplexing may start after the first continuous set of DMRS in each hop in the case that intra-slot frequency hopping is enabled.

Regarding URLLC UCI multiplexing on eMBB PUSCH, due to ultra-reliability and low-latency requirements of URLLC traffic, the UCI of URLLC traffic also requires low-latency fast-feedback and much lower error probability. For example, the corresponding HARQ-ACK feedback for a PDSCH needs to be reported in a very short time compared with eMBB. The period of CSI for URLLC may have a much shorter periodicity.

As a result, different from eMBB UCI, several cases may happen for URLLC UCI multiplexing on eMBB PUSCH. More than one HARQ-ACK may happen in a PUSCH duration. If the CSI periodicity is very short, more than one CSI report may happen in an eMBB PUSCH.

To support URLLC UCI multiplexing on eMBB PUSCH, several aspects may be enhanced over existing UCI multiplexing methods on PUSCH. Frist, different beta offset values may be configured for HARQ-ACK of URLLC PDSCH feedback and CSI report for URLLC. For the same UCI type, the beta offset value should be higher than that of the eMBB beta offset to allocate more resources elements for the same number of UCI bits. The HARQ-ACK timing for URLLC may be maintained as much as possible to avoid extra delay due to UCI multiplexing. A URLLC PUCCH may fully overlap or partial overlap with an eMBB PUSCH. The UCI multiplexing location may be different based on the overlapping conditions.

For overlapping URLLC PUCCH for HARQ-ACK feedback and eMBB PUSCH transmission, URLLC HARQ-ACK multiplexing on eMBB PUSCH may be supported, especially if simultaneous PUCCH and PUSCH transmission is not configured or not supported. If simultaneous PUCCH and PUSCH is supported, the URLLC PUCCH and eMBB PUSCH may be transmitted simultaneously. The eMBB PUSCH may be punctured if there are overlapping REs between the PUCCH and PUSCH. In power limited cases, the eMBB PUSCH may be power scaled to reduce the total transmission power to the maximum power limit.

The conditions for URLLC UCI multiplexing on eMBB PUSCH are discussed herein. The support of URLLC UCI multiplexing on eMBB PUSCH can be determined based on timing requirements, including processing time, HARQ timing indication, delay tolerance, etc. If the conditions are satisfied, URLLC UCI is multiplexed on eMBB PUSCH. The detailed UCI multiplexing methods may then be specified on the location and mapping rules for UCI multiplexing.

If the conditions are not satisfied, it should not be treated as an error case, the UE behavior may be specified to give higher priority to URLLC traffic. Thus, the URLLC UCI may be transmitted on a URLLC PUCCH resource, and the overlapping symbols of PUSCH may be punctured or dropped. That is, if the conditions are not satisfied, a priority-based channel dropping should be specified. For example, the following priority rule can be applied: URLLC HARQ-ACK and SR>URLLC CSI>eMBB PUSCH (where "A>B" indicates A has a higher priority than B).

In the case that the UCI multiplexing conditions are not satisfied, for the eMBB PUSCH dropping, several detailed methods are described herein. In one method, only the overlapping symbols with a URLLC PUCCH are dropped on the eMBB PUSCH. If there are remaining PUSCH symbols after the overlapping symbols, the eMBB PUSCH transmission is resumed, and the remaining PUSCH symbols after the overlapping symbols are transmitted.

In another method, the overlapping symbols with a URLLC PUCCH are dropped on the eMBB PUSCH. If there are remaining PUSCH symbols after the overlapping symbols, the eMBB PUSCH transmission is not resumed, and all remaining symbols are also dropped.

In yet another method, whether the eMBB PUSCH transmission is resumed or not is determined by whether a DMRS symbol is punctured in the overlapping symbols. If DMRS is dropped in the overlapping symbols, and if there are remaining PUSCH symbols after the overlapping symbols with the dropped DMRS as the reference symbols, the eMBB PUSCH transmission is not resumed, and all remaining symbols are also dropped. Otherwise, if there is no DMRS in the overlapping symbols, and if there are remaining PUSCH symbols after the overlapping symbols, the eMBB PUSCH is resumed, and the remaining PUSCH symbols after the overlapping symbols are transmitted.

Figure 2:
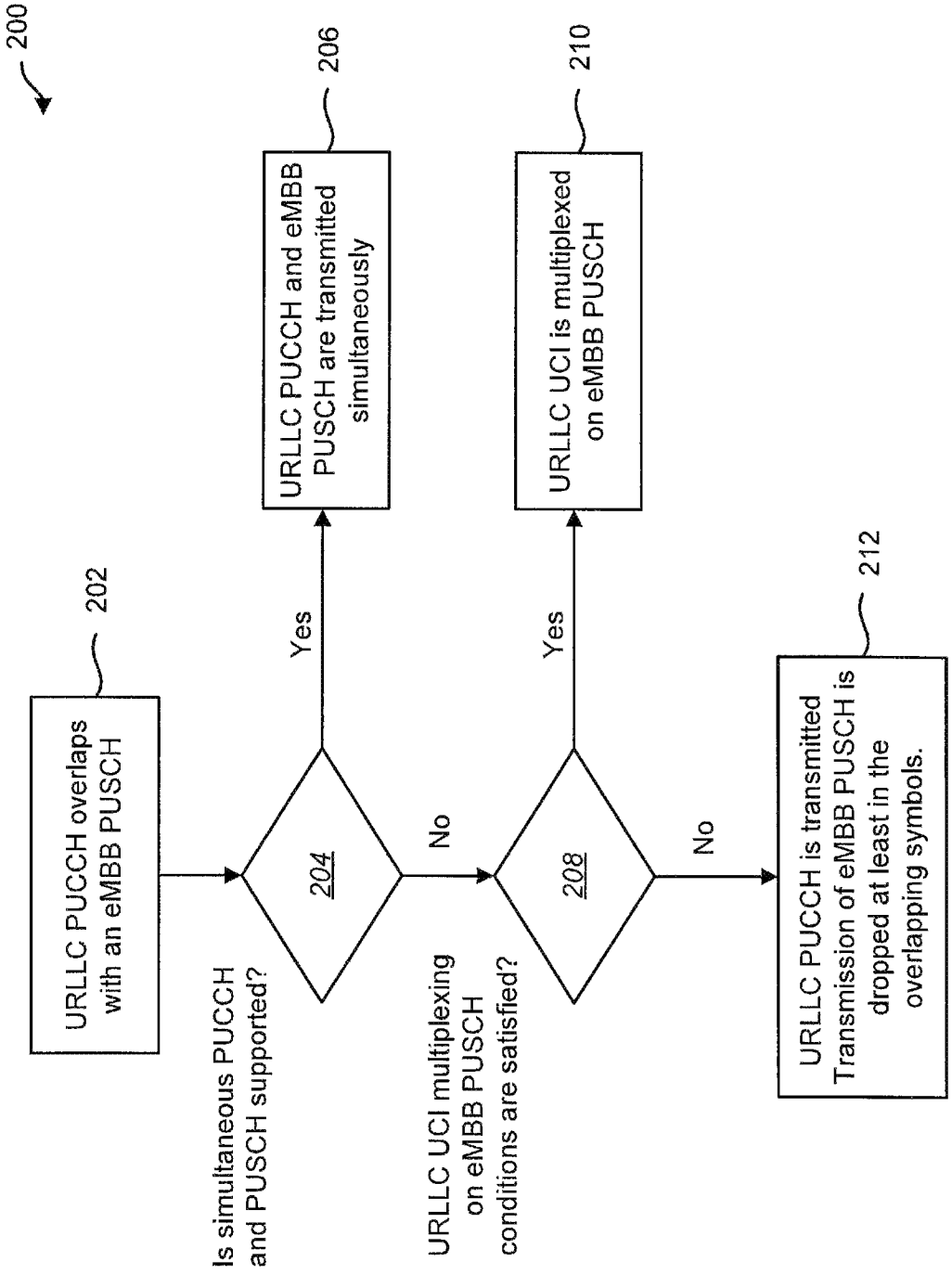
FIG. 2 is a flow diagram illustrating a method for collision handling between URLLC PUCCH and eMBB PUSCH.

In yet another method, the dropping conditions are determined based on the relative arriving time between the URLLC PUCCH and the eMBB PUSCH. If the URLLC PUCCH arrives earlier than or at the same time as the eMBB PUSCH, the eMBB PUSCH is dropped altogether. If the URLLC PUCCH arrives later than the eMBB PUSCH, the overlapping symbols of eMBB PUSCH is dropped, as described in the methods above. FIG. 2 is an example illustrating collision handling between URLLC PUCCH and eMBB PUSCH.

Regarding conditions and methods for URLLC UCI multiplexing on eMBB PUSCH, if the PUCCH for URLLC overlaps with an eMBB PUSCH, UCI multiplexing on eMBB PUSCH should be considered. However, whether UCI multiplexing can be supported depends on the UCI multiplexing methods and timing conditions. Several approaches may be considered for URLLC UCI multiplexing on eMBB PUSCH.

In a first approach (Approach 1), UCI is multiplexed on overlapping symbols between the URLLC PUCCH and the eMBB PUSCH. In this approach, to maintain the UCI timing based on URLLC PUCCH, the UCI of URLLC PUCCH is multiplexed on overlapping symbols between the URLLC PUCCH and the eMBB PUSCH. The actual required resource elements in the UCI multiplexing symbols are determined by the beta offset, payload size, PUSCH parameters, etc.

Figure 3:
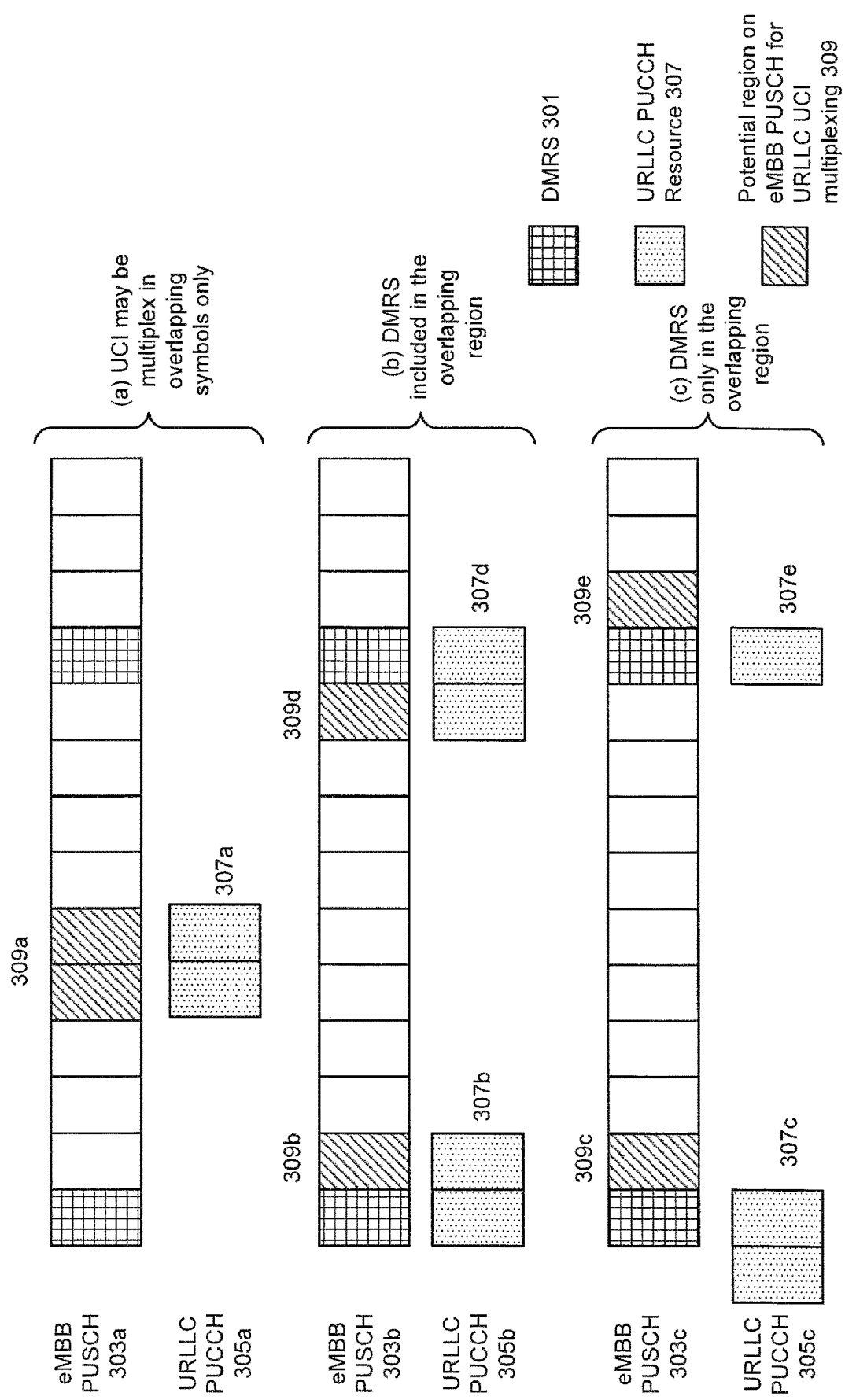
FIG. 3 illustrates examples of UCI multiplexing in overlapping symbols between URLLC PUCCH and eMBB PUSCH.

In this case, the starting symbol for URLLC multiplexing on eMBB PUSCH may be determined based on overlapping symbol location. It may be any symbol in a PUSCH, and may not be a symbol immediately after a DMRS. FIG. 3 shows an example of a 14-symbol PUSCH with PUSCH mapping type B and 1 additional DMRS position. There are 2 single-symbol DMRSs at indexes {0,10} as shown in FIG. 3.

If a DMRS is included in the overlapping symbols, UCI is not multiplexed on the DMRS symbol, and UCI may be multiplexed on other symbols in the overlapping symbols, as shown in FIG. 3(b). It should be noted that the DMRS may or may not be the first continuous sets of DMRS in a slot, or in a hop in the case of frequency hopping is enabled.

If the only overlapping symbol is a DMRS, or all overlapping symbols are DMRS symbols, in one method, the UCI may be multiplexed to the symbols immediately after the DMRS in the overlapping region, as shown in FIG. 3(c). In another method, the UCI multiplexing is not supported, and channel priority handling is used. In this method, the URLLC PUCCH is transmitted, and the PUSCH may be punctured or dropped.

If the REs in the overlapping symbols cannot satisfy the number of RE requirements for the UCI, in one method, the UCI multiplexing may be extended to the symbols after the overlapping symbols. In another method, the UCI multiplexing is not supported, and channel priority handling is used. In this case, the URLLC PUCCH is transmitted, and the eMBB PUSCH is punctured.

If the UCI multiplexing is extended beyond the overlapping region, a delay tolerance may be specified or configured by higher layer signaling. The delay tolerance defines how many symbols are allowed for the last symbol of UCI multiplexing on PUSCH to be postponed compared with the last symbol of the original PUCCH resource. The delay tolerance may be determined based on the URLLC PUCCH configurations. For example, if there are multiple PUCCH resources for URLLC HARQ-ACK, the UCI multiplexing on eMBB PUSCH of a URLLC HARQ-ACK for a PUCCH resource cannot be extended to the next URLLC HARQ-ACK PUCCH resource.

If there is no tolerance, the UCI multiplexing should not be extended after overlapping symbols between the URLLC PUCCH and eMBB PUSCH. The tolerance may be used to avoid ambiguity if multiple HARQ-ACK PUCCH resources are configured in a slot.

For this approach, the starting symbol for UCI multiplexing symbol may not be immediately after a DMRS. It could be far away from a DMRS. Thus, the performance of UCI decoding may be degraded. To avoid such a case, the distance between the starting symbol of UCI multiplexing and the corresponding DMRS may be confined within a threshold limit (e.g., the starting symbol of UCI multiplexing may be within 2, 3 or 4 symbols from the DMRS in the same slot or hop in the case of frequency hopping). The corresponding DMRS is the DMRS that is used to demodulate the symbols of UCI multiplexing.

Therefore, if the distance between the starting symbol for URLLC UCI multiplexing symbol on eMBB PUSCH and the corresponding DMRS is within the threshold limit from the corresponding DMRS, URLLC UCI multiplexing on eMBB PUSCH is supported. If the distance between the starting symbol for URLLC UCI multiplexing symbol on eMBB PUSCH and the corresponding DMRS is larger than the threshold limit from the corresponding DMRS, URLLC UCI multiplexing on eMBB PUSCH is not supported. In this case, the channel priority handling should be used where the URLLC PUCCH is transmitted, and the eMBB PUSCH is punctured.

In a second approach (Approach 2), UCI is multiplexed on overlapping symbols between the sub-slot containing the URLLC PUCCH and the eMBB PUSCH. If a sub-slot structure is defined or configured for URLLC PUCCH resources, for URLLC HARQ-ACK feedback, the timing indication determines the sub-slot that contains the PUCCH resources for HARQ-ACK feedback. The actual PUCCH resource may be determined in the set of PUCCH resources based on ARI and payload size. Therefore, the indicated timing is based on the sub-slot location instead of the actual PUCCH resource, although a PUCCH resource should be contained within a sub-slot.

Figure 4:
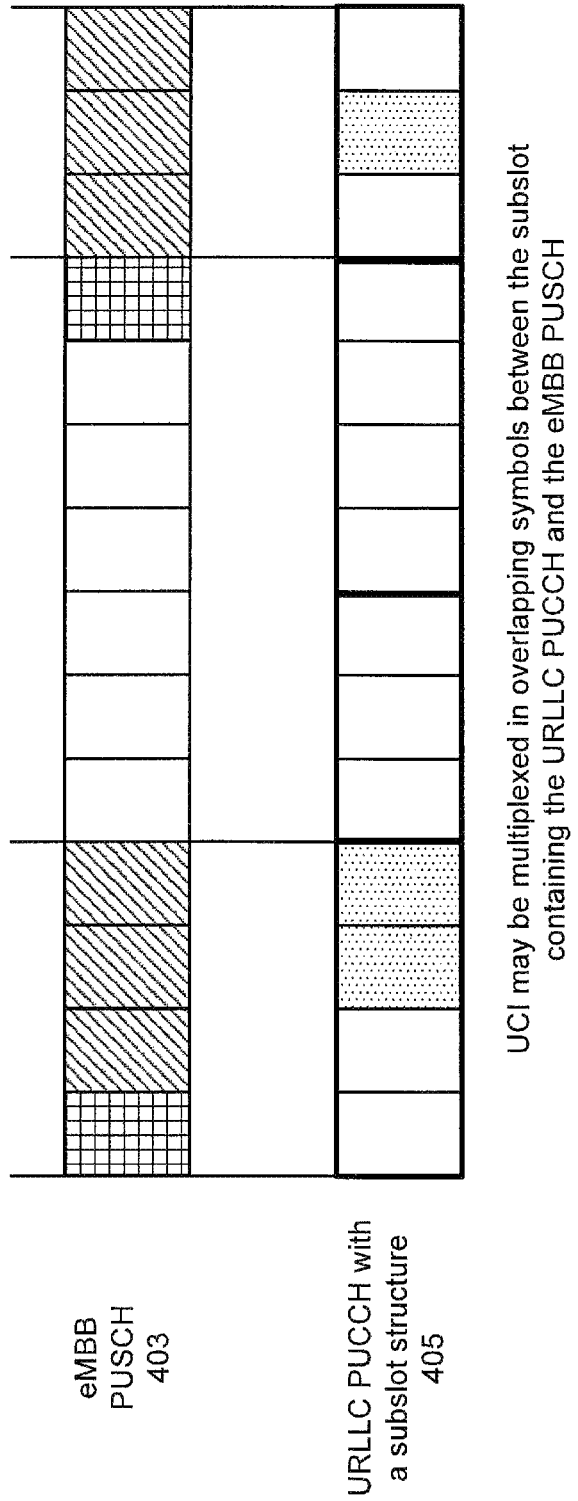
FIG. 4 illustrates an example of UCI multiplexing based on the overlapping symbols between the sub-slot containing the URLLC PUCCH and the eMBB PUSCH.

Therefore, when determining the UCI multiplexing location on an eMBB PUSCH, the sublot that contains the PUCCH resource can be used. In this approach, to maintain the PDSCH to HARQ timing based on sub-slot, the UCI of URLLC PUCCH is multiplexed on overlapping symbols between the sublot that contains the PUCCH resource and the eMBB PUSCH, as shown in FIG. 4. The actual resource elements in the UCI multiplexing symbols are determined by the beta offset, payload size, PUSCH parameters, etc.

In this case, the starting symbol for URLLC multiplexing on eMBB PUSCH is determined based on the overlapping symbol location between the sub-slot that contains the PUCCH and the PUSCH. The starting symbol may be any symbol in a PUSCH, and may not be a symbol immediately after a DMRS.

If a DMRS is included in the overlapping symbols, UCI is not multiplexed on the DMRS symbol, and UCI is multiplexed on other symbols in the overlapping symbols. Note that the DMRS may or may not be the first continuous sets of DMRS in a slot, or in a hop in the case of frequency hopping.

If the only overlapping symbol is a DMRS, or all overlapping symbols are DMRS symbols, in one method, the UCI is multiplexed to the symbols immediately after the DMRS in the overlapping region. In another method, the UCI multiplexing is not supported, and channel priority handling is used. So that the URLLC PUCCH is transmitted, and the PUSCH is punctured.

If the REs in the overlapping symbols cannot satisfy the number of RE requirements for the UCI on PUSCH, in one method, the UCI multiplexing may be extended to the next symbol after the overlapping symbols. In another method, the UCI multiplexing is not supported, and channel priority handling is used where the URLLC PUCCH is transmitted, and the PUSCH is punctured.

If the UCI multiplexing is extended beyond the overlapping region, a delay tolerance may be specified or configured by higher layer signaling. The delay tolerance defines how many symbols are allowed for the last symbol of UCI multiplexing on PUSCH to be postponed compared with the last symbol of the sub-slot containing the original PUCCH resource. The delay tolerance may be determined based on the URLLC PUCCH configurations. For example, if there are multiple PUCCH resources for URLLC HARQ-ACK, the UCI multiplexing on eMBB PUSCH of a URLLC HARQ-ACK for a PUCCH resource in one sub-slot cannot be extended to the sub-slot that contains the next URLLC HARQ-ACK PUCCH resource. If there is no tolerance, the UCI multiplexing should not be extended after the sub-slot containing the corresponding PUCCH. The tolerance may be used to avoid ambiguity if multiple HARQ-ACK PUCCH resources are configured in a slot.

Also for this approach, the starting symbol for UCI multiplexing symbol may not be immediately after a DMRS. It could be far away from a DMRS. Thus, the performance of UCI decoding may be degraded. To avoid such a case, the distance between the starting symbol of UCI multiplexing and the corresponding DMRS may be confined within a threshold limit (e.g., the starting symbol of UCI multiplexing is within 2, 3 or 4 symbols from the DMRS in the same slot or hop in the case of frequency hopping). The corresponding DMRS is the DMRS that is used to demodulate the symbols of UCI multiplexing.

Therefore, if the distance between the starting symbol for URLLC UCI multiplexing symbol on eMBB PUSCH and the corresponding DMRS is within the threshold limit from the corresponding DMRS, URLLC UCI multiplexing on eMBB PUSCH is supported. If the distance between the starting symbol for URLLC UCI multiplexing symbol on eMBB PUSCH and the corresponding DMRS is larger than the threshold limit from the corresponding DMRS, URLLC UCI multiplexing on eMBB PUSCH is not supported. In this case, the channel priority handling should be used where the URLLC PUCCH is transmitted, and the eMBB PUSCH is punctured.

To summarize Approach 1 and Approach 2, UCI multiplexing may start from overlapping symbols between PUCCH and eMBB PUSCH (Approach 1), or between the sub-slot containing the URLLC PUCCH and the eMBB PUSCH (Approach 2). If DMRS is contained in the overlapping region, UCI is not multiplexed on DMRS. The UCI multiplexing may be limited within the overlapping symbols. The UCI multiplexing may be extended beyond the overlapping symbols. A delay tolerance may be specified to limit the UCI feedback delay.

For UCI multiplexing conditions for Approach 1 and Approach 2, if UCI multiplexing starts from overlapping symbols between PUCCH and eMBB PUSCH (Approach 1), or between the sub-slot containing the URLLC PUCCH and the eMBB PUSCH (Approach 2), UCI multiplexing is not supported under the following conditions: all overlapping symbols are DMRS symbols; and/or the REs in the overlapping region are not enough to carry the UCI.

In a third approach (Approach 3), UCI may be multiplexed from a symbol that is immediately after a DMRS if the timing requirements are satisfied. In this approach, UCI may be multiplexed from a symbol that is immediately after a DMRS as in Rel-15. But the starting symbol location can be more flexible than Rel-15 UCI multiplexing. The actual resource elements in the UCI multiplexing symbols may be determined by the beta offset, payload size, PUSCH parameters, etc.

Furthermore, the PUCCH resource for HARQ-ACK of URLLC may be determined based on the PDSCH to HARQ-ACK timing, which may be implicitly or explicitly determined based on DCI indication. If the UCI multiplexing starts immediately after a DMRS in an eMBB PUSCH, the timing is modified, and the timing conditions may be checked to see if UCI multiplexing on PUSCH can be supported.

Whether it is possible to multiplex URLLC UCI on eMBB PUSCH can be determined based on the timing requirements. In the following context, the HARQ-ACK for URLLC PDSCH transmission may be used to illustrate the timing requirements. Several conditions may be checked. First, the starting symbol for URLLC multiplexing should satisfy the processing time and the indicated PDSCH to HARQ timing. Second, if the UCI is multiplexed over multiple symbol, the end of the last symbol for UCI multiplexing should be within a delay tolerance so that the feedback is not outdated or collides with another potential URLLC PUCCH reporting (e.g., another URLLC HARQ-ACK PUCCH resource).

Regarding condition 1, the URLLC PDSCH processing time is satisfied at the starting symbol of UCI multiplexing. The minimum URLLC PDSCH to HARQ-ACK processing time is a UE capability, defined as N1 symbols. At a minimum, the distance between the last symbols of the last URLLC PDSCH transmission and the first symbol of UCI multiplexing should be greater than or equal to N1 symbols.

Furthermore, the PDSCH to HARQ timing may be implicitly or with a default K1 value. The PDSCH to HARQ timing may be explicitly determined by PDSCH to HARQ-ACK indication in a DCI with a K1 value. K1 may indicate the number of symbols or the number of sub-slots from the last symbols of a URLLC PDSCH to the HARQ-ACK feedback on a PUCCH or PUSCH.

It should be noted that the timing derived based on the K1 value should satisfy the minimum processing time requirements. In other words, the timing derived based on the K1 value should be greater than N1 symbols or N1 sub-slots depending on the unit of K1 indication. Thus, if K1 is explicitly indicated or implicitly determined, the distance between the last symbols of the last URLLC PDSCH transmission and the first symbol of UCI multiplexing on PUSCH should satisfy the timing by the K1 indication. For example, if sub-slot is configured for URLLC PUCCH, with a K1 indication, the distance between the last symbols of the last URLLC PDSCH transmission and the first symbol of UCI multiplexing on PUSCH should be greater than or equal to K1 sub-slots. Thus, if supported, the starting symbol of UCI multiplexing should be within or after the indicated sub-slot by the PDSCH to HARQ timing indication.

Regarding condition 2, the delay for HARQ-ACK multiplexing on PUSCH may be within a limit. If the UCI multiplexing is extended beyond the overlapping region between the indicated sub-slot and eMBB PUSCH, a delay tolerance may be specified or configured by higher layer signaling. The delay tolerance defines how many symbols are allowed for the last symbol of UCI multiplexing on PUSCH to be postponed compared with the last symbol of the original PUCCH resource. The delay tolerance may be determined based on the URLLC PUCCH configurations. For example, if there are multiple PUCCH resources for URLLC HARQ-ACK, the UCI multiplexing on the eMBB PUSCH of a URLLC HARQ-ACK for a PUCCH resource cannot be extended to the next URLLC HARQ-ACK PUCCH resource. If the sub-slot is configured for URLLC, the UCI multiplexing on eMBB PUSCH of a URLLC HARQ-ACK for a PUCCH resource cannot be extended to the sub-slot containing the next URLLC HARQ-ACK PUCCH resource.

If there is no tolerance, the UCI multiplexing should not be extended after overlapping symbols between the URLLC PUCCH and eMBB PUSCH. Alternatively, the UCI multiplexing should not be extended to the overlapping symbols between the sub-slot containing the URLLC PUCCH and eMBB PUSCH. The tolerance may be used to avoid ambiguity if multiple HARQ-ACK PUCCH resources are configured in a slot.

Condition 1 and condition 2 above together may define the potential symbols for URLLC UCI multiplexing on eMBB PUSCH. In other words, condition 1 and condition 2 may define the potential UCI multiplexing region.

There are several cases that depend on the PUCCH resource configuration and allocation methods. In one case, the PUCCH resource may be contained in the indicated sub-slot by a PDSCH to HARQ-ACK indication. The starting symbol for UCI multiplexing should be within or after the sub-slot of the collision between the URLLC PUCCH and eMBB PUSCH.

In another case, PUCCH resources may not be configured in every sub-slot. In this case, the indicated sub-slot is before the actual PUCCH resource. But PUCCH resources may not be configured in that sub-slot, and the earliest PUCCH resource in a later sub-slot is used. The URLLC PUCCH collision with eMBB PUSCH may occur in the later sub-slot. In this case, the UCI multiplexing may start in overlapping symbols within or after the original indicated sub-slot location.

Figure 5:
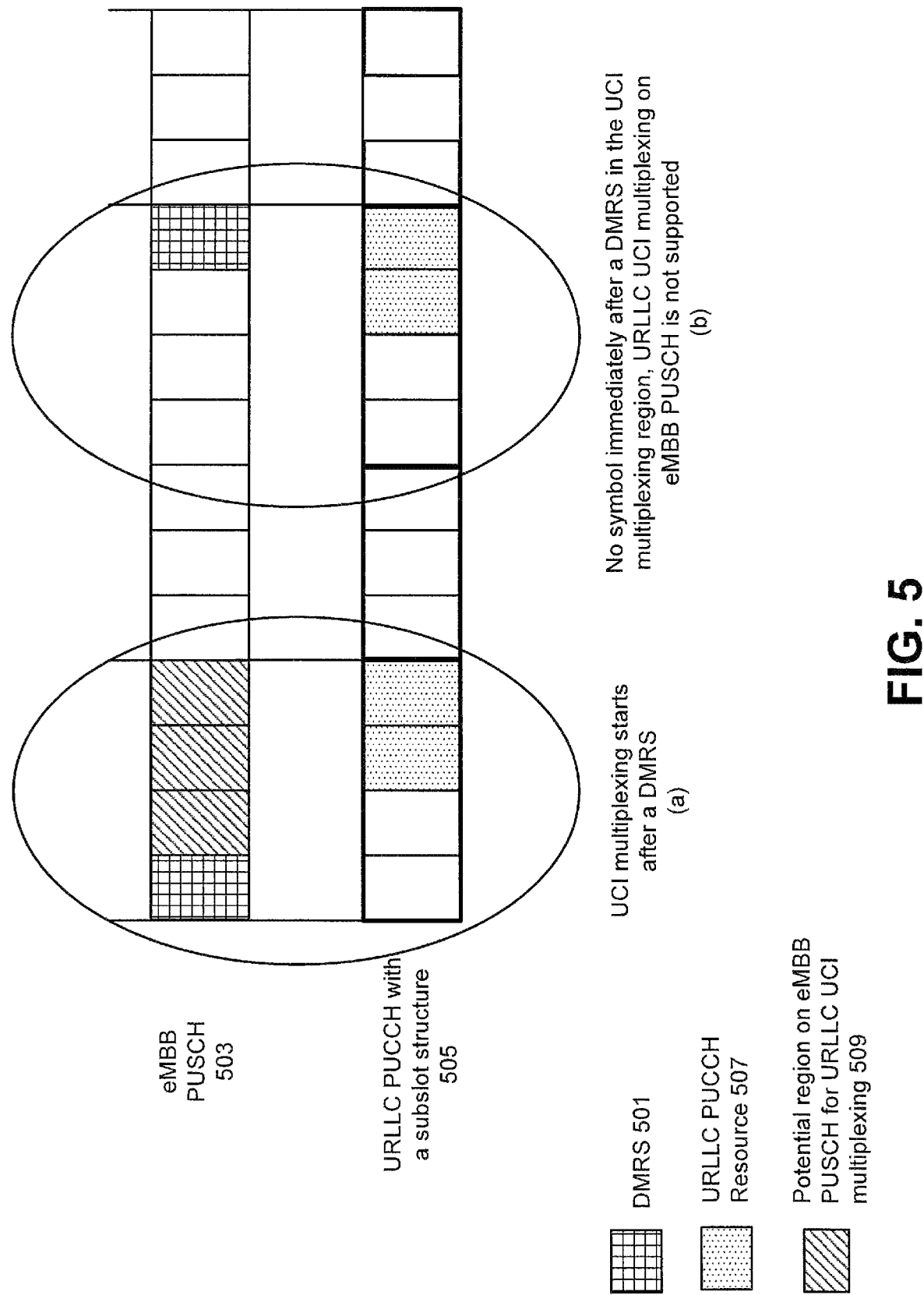
FIG. 5 illustrates an example of UCI multiplexing after the first continuous demodulation reference signal (DMRS) in the potential UCI multiplexing region determined by timing requirements.

However, different from Approach 1 and Approach 2, the UCI multiplexing starts only after a DMRS symbol in this approach. If there is no symbol in the potential UCI multiplexing region immediately after a DMRS, URLLC UCI multiplexing on eMBB PUSCH is not supported. If there is any symbol immediately after a DMRS in the potential UCI multiplexing region, the UCI is multiplexed after the first continuous DMRS symbol(s) in the potential UCI multiplexing region. FIG. 5 illustrates two examples of UCI multiplexing after the first continuous DMRS in the potential UCI multiplexing region determined by timing requirements.

In the case of a collision between URLLC PUCCH and eMBB PUSCH, for UCI multiplexing on eMBB PUSCH, the timing conditions may be evaluated on each set of continuous DMRS(s) of the PUSCH. The earliest DMRS(s) that satisfied the timing requirement should be used to perform UCI multiplexing.

It may be too restrictive to allow UCI multiplexing only immediately after a DMRS. The restriction may be reduced by allowing a maximum distance between the corresponding DMRS and the starting symbol of the UCI multiplexing. The distance between the starting symbol of UCI multiplexing and the corresponding DMRS may be confined within a threshold limit (e.g., the starting symbol of UCI multiplexing may be within 2, 3 or 4 symbols from the DMRS in the same slot or hop in case of frequency hopping). The corresponding DMRS is the DMRS that is used to demodulate the symbols of UCI multiplexing.

Therefore, if the distance between the starting symbol for URLLC UCI multiplexing symbol on eMBB PUSCH and the corresponding DMRS is within the threshold limit from the corresponding DMRS, URLLC UCI multiplexing on eMBB PUSCH is supported. If the distance between the starting symbol for URLLC UCI multiplexing symbol on eMBB PUSCH and the corresponding DMRS is larger than the threshold limit from the corresponding DMRS, URLLC UCI multiplexing on eMBB PUSCH is not supported. In this case, channel priority handling should be used where the URLLC PUCCH is transmitted, and the eMBB PUSCH is punctured.

The Approach 3 for URLLC UCI multiplexing on eMBB PUSCH is different from Rel-15 UCI multiplexing on PUSCH in several aspects. First, any DMRS(s) in the eMBB PUSCH may be used for URLLC UCI multiplexing on eMBB PUSCH. It does not need to be the first continuous set of DMRS in a slot or in a hop in case of frequency hopping is enabled. In the case that an additional DMRS in eMBB PUSCH is configured, the addition DMRS may also be used, and UCI multiplexing may start immediately after an additional DMRS.

Second, UCI multiplexing may be performed in one set of symbols, where no UCI segmentation is performed even if frequency hopping is enabled. If frequency hopping is configured, the UCI multiplexing may be performed in only one hop. For example, the URLLC PUCCH may collide only in the second hop of the eMBB PUSCH. In this case, there is no way the URLLC UCI can be multiplexed on the first hop of the eMBB PUSCH. On the contrary, the URLLC PUCCH may collide in the first hop of an eMBB PUSCH, the UCI may not be multiplexed to the second hop due to ultra-low latency requirements.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH configuration and resource allocation as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding.

For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 is a flow diagram illustrating a method 200 for collision handling between URLLC PUCCH and eMBB PUSCH. The method 200 may be implemented by a UE 102. The UE 102 may determine 202 that the URLLC PUCCH overlaps with an eMBB PUSCH. The UE 102 may determine 204 whether simultaneous PUCCH and PUSCH are supported. If simultaneous PUCCH and PUSCH are supported, then the UE 102 may transmit 204 URLLC PUCCH and eMBB PUSCH simultaneously.

If the UE 102 determines 204 that simultaneous PUCCH and PUSCH are not supported, then the UE 102 may determine 208 whether URLLC uplink control information (UCI) multiplexing on eMBB PUSCH conditions are satisfied. The UCI multiplexing on eMBB PUSCH conditions are described in connection with FIG. 1. If URLLC UCI multiplexing on eMBB PUSCH conditions are satisfied, then URLLC UCI is multiplexed 210 on eMBB PUSCH.

If the UE 102 determines 208 that URLLC UCI multiplexing on eMBB PUSCH conditions are not satisfied, then in step 212, the UE 102 may transmit URLLC PUCCH. The transmission of eMBB PUSCH may be dropped at least in the overlapping symbols.

FIG. 3 illustrates examples of UCI multiplexing in overlapping symbols between URLLC PUCCH and eMBB PUSCH. FIG. 3 shows an example of a 14 symbol PUSCH with PUSCH mapping type B and 1 additional DMRS position. There are 2 single-symbol DMRSs 301 at indexes {0,10}. FIG. 3 further shows the URLLC PUCCH resource(s) 307 that collides with the eMBB PUSCH, and a potential region 309 on the eMBB PUSCH for URLLC UCI multiplexing.

In a first example 3(a), URLLC PUCCH 305*a* and eMBB PUSCH 303*a* are shown. In this method, UCI may be multiplexed in overlapping symbols 309*a* only between the URLLC PUCCH resource 307*a* and eMBB PUSCH 303*a*.

In a second example 3(b), URLLC PUCCH 305*b* and eMBB PUSCH 303*b* are shown. In this example, DMRS 301 is included in the overlapping region. If a DMRS 301 is included in the overlapping symbols, UCI is not multiplexed on the DMRS symbol 301, and UCI is multiplexed on other symbols in the overlapping symbols, as shown in 309*b* between the URLLC PUCCH resource 307*b* and eMBB PUSCH 303*b*, and the overlapping symbols 309*b* between the URLLC PUCCH resource 307*d* and eMBB PUSCH 303*b* respectively in these two examples.

In a third example 3(c), URLLC PUCCH 305*c* and eMBB PUSCH 303*c* are shown. In this example, DMRS 301 is only in the overlapping region. If the only overlapping symbol is a DMRS 301, or all overlapping symbols are DMRS symbols, the UCI is multiplexed to the symbols immediately after the DMRS 301 in the overlapping region, as shown in 309*c* immediately after the URLLC PUCCH resource 307*c* on the eMBB PUSCH 303*c*, and 309*e* immediately after the URLLC PUCCH resource 307*e* on the eMBB PUSCH 303*c* respectively in these two examples.

FIG. 4 illustrates an example of UCI multiplexing based on the overlapping symbols between the sub-slot containing the URLLC PUCCH 405 and the eMBB PUSCH 403. FIG. 4 further shows the URLLC PUCCH resource(s) 407 that collides with the eMBB PUSCH 403, and a potential region 409 on the eMBB PUSCH 403 for URLLC UCI multiplexing.

To maintain the PDSCH to HARQ timing based on sub-slot, the UCI of URLLC PUCCH 405 is multiplexed on overlapping symbols between the sublot that contains the PUCCH 405 resource and the eMBB PUSCH 403. If a DMRS 401 is included in the overlapping symbols, UCI is not multiplexed on the DMRS symbol, and UCI is multiplexed on other symbols in the overlapping symbols.

FIG. 5 illustrates an example of UCI multiplexing after the first continuous DMRS 501 in the potential UCI multiplexing region determined by timing requirements. FIG. 5 shows an eMBB PUSCH 403 and a URLLC PUCCH 405 with a sub-slot structure. FIG. 5 further shows the URLLC PUCCH resource(s) 507 that collides with the eMBB PUSCH 503, and a potential region 509 on the eMBB PUSCH 503 for URLLC UCI multiplexing.

In example 5(a), UCI multiplexing starts after a DMRS 501. In example 5(b), there is no symbol immediately after a DMRS in the UCI multiplexing region. In this case, URLLC UCI multiplexing on eMBB PUSCH is not supported.

Figure 6:
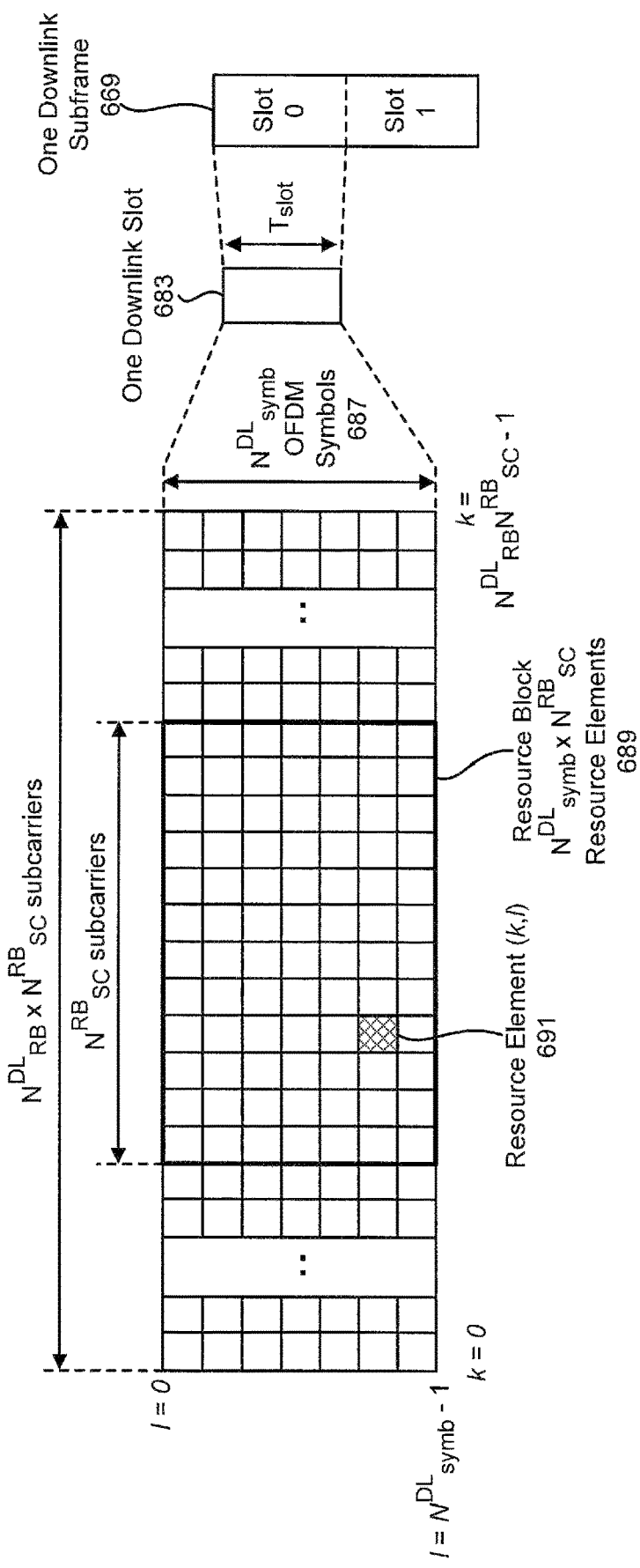
FIG. 6 is a diagram illustrating an example of a resource grid for the downlink.

FIG. 6 is a diagram illustrating one example of a resource grid for the downlink. The resource grid illustrated in FIG. 6 may be utilized in some implementations of the systems and methods disclosed herein. More detail regarding the resource grid is given in connection with FIG. 1.

In FIG. 6, one downlink subframe 669 may include two downlink slots 683. $N^{DL}_{RB}$ is downlink bandwidth configuration of the serving cell, expressed in multiples of $N^{RB}_{sc}$, where $N^{RB}_{sc}$ is a resource block 689 size in the frequency domain expressed as a number of subcarriers, and $N^{DL}_{symb}$ is the number of OFDM symbols 687 in a downlink slot 683. A resource block 689 may include a number of resource elements (RE) 691.

For a PCell, $N^{DL}_{RB}$ is broadcast as part of system information. For an SCell (including an Licensed Assisted Access (LAA) SCell), $N^{DL}_{RB}$ is configured by a RRC message dedicated to a UE 102. For PDSCH mapping, the available RE 691 may be the RE 691 whose index l fulfils l≥l in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 7:
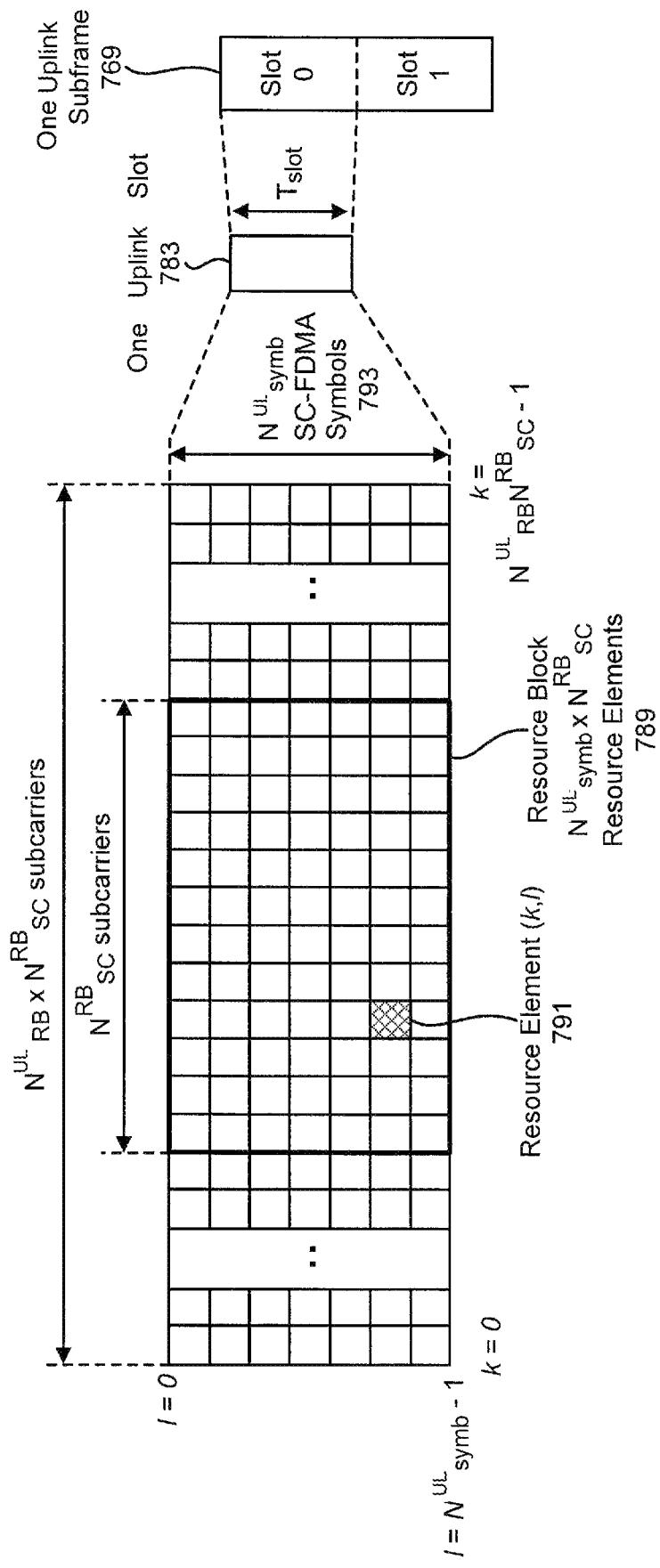
FIG. 7 is a diagram illustrating one example of a resource grid for the uplink.

FIG. 7 is a diagram illustrating one example of a resource grid for the uplink. The resource grid illustrated in FIG. 7 may be utilized in some implementations of the systems and methods disclosed herein. More detail regarding the resource grid is given in connection with FIG. 1.

In FIG. 7, one uplink subframe 769 may include two uplink slots 783. $N^{UL}_{RB}$ is uplink bandwidth configuration of the serving cell, expressed in multiples of $N^{RB}_{sc}$, where $N^{RB}_{sc}$ is a resource block 789 size in the frequency domain expressed as a number of subcarriers, and $N^{UL}_{symb}$ is the number of SC-FDMA symbols 793 in an uplink slot 783. A resource block 789 may include a number of resource elements (RE) 791.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 8:
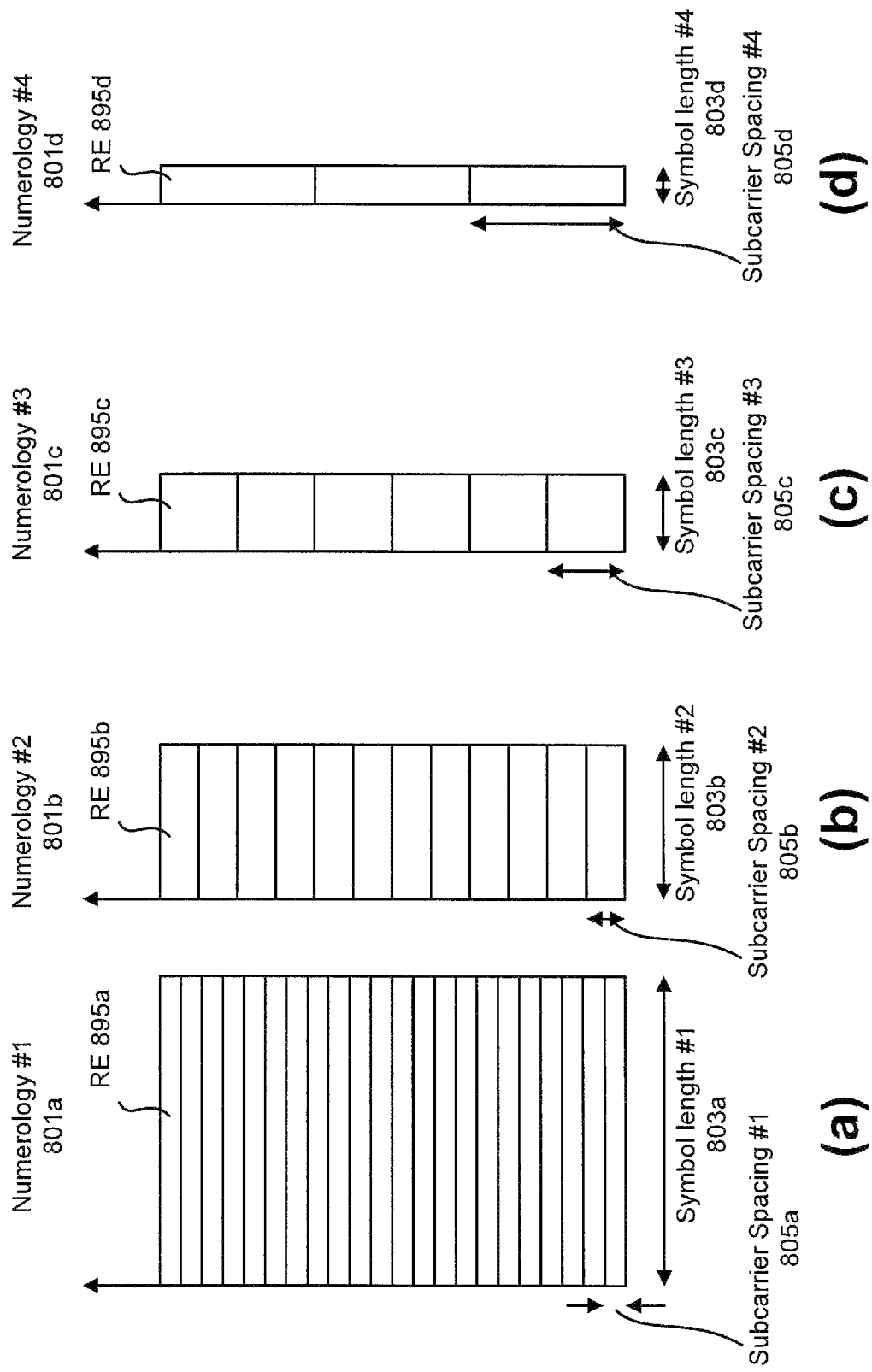
FIG. 8 shows examples of several numerologies.

FIG. 8 shows examples of several numerologies 801. The numerology #1 801a may be a basic numerology (e.g., a reference numerology). For example, a RE 895a of the basic numerology 801a may be defined with subcarrier spacing 805a of 15 kHz in frequency domain and 2048Ts+CP length (e.g., 160Ts or 144Ts) in time domain (i.e., symbol length #1 803a), where Ts denotes a baseband sampling time unit defined as 1/(15000*2048) seconds. For the i-th numerology, the subcarrier spacing 805 may be equal to $15*2^i$ and the effective OFDM symbol length $2048*2^{-i}$*Ts. It may cause the symbol length is $2048*2^{-i}$*Ts+CP length (e.g., $160*2^{-i}$*Ts or $144*2^{-i}$*Ts). In other words, the subcarrier spacing of the i+1-th numerology is a double of the one for the i-th numerology, and the symbol length of the i+1-th numerology is a half of the one for the i-th numerology. FIG. 8 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 9:
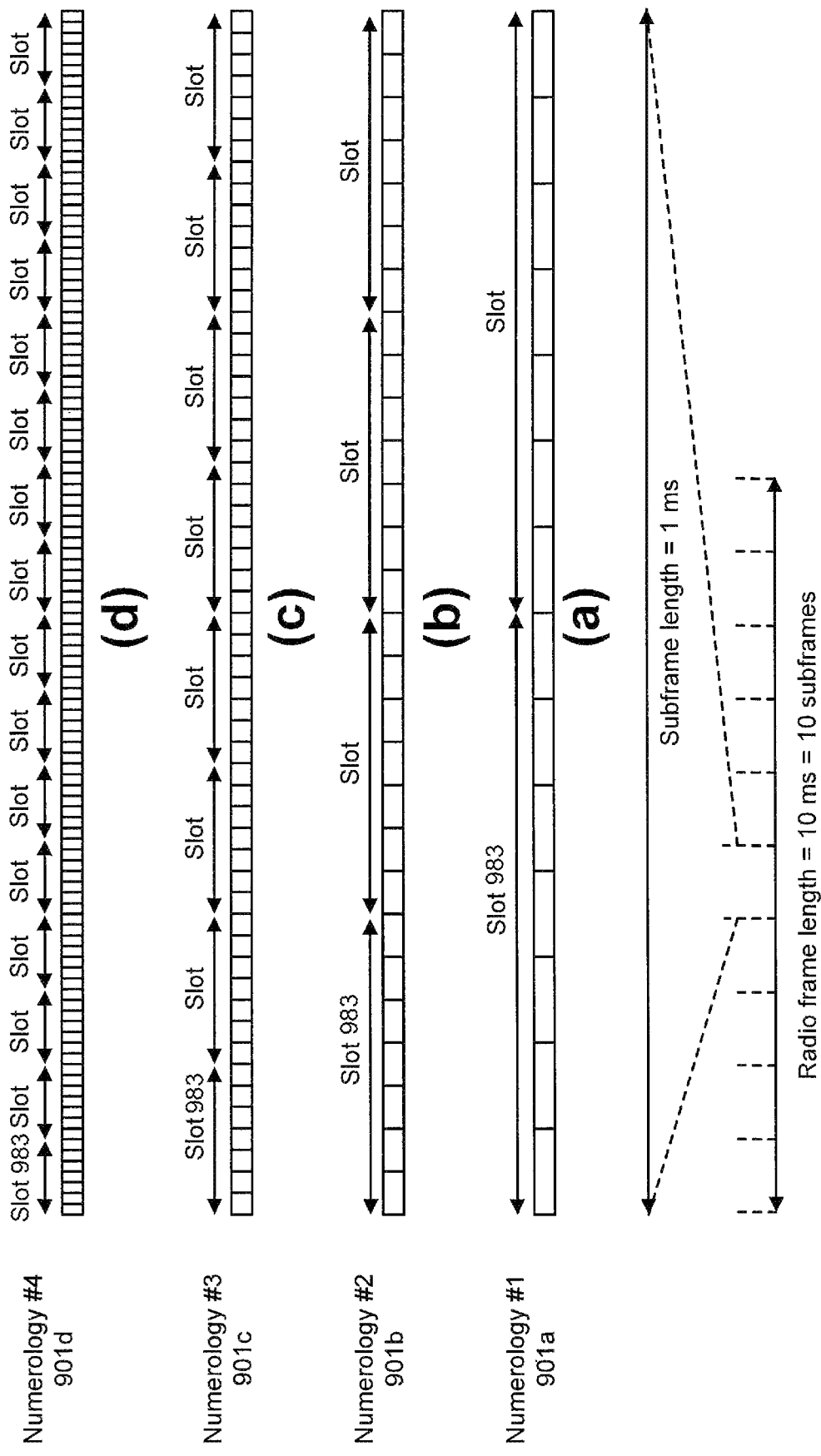
FIG. 9 shows examples of subframe structures for the numerologies that are shown in FIG. 8.

FIG. 9 shows examples of subframe structures for the numerologies 901 that are shown in FIG. 8. Given that a slot 983 includes $N^{DL}_{symb}$ (or $N^{UL}_{symb}$)=7 symbols, the slot length of the i+1-th numerology 901 is a half of the one for the i-th numerology 901, and eventually the number of slots 983 in a subframe (i.e., 1 ms) becomes double. It may be noted that a radio frame may include 10 subframes, and the radio frame length may be equal to 10 ms.

Figure 10:
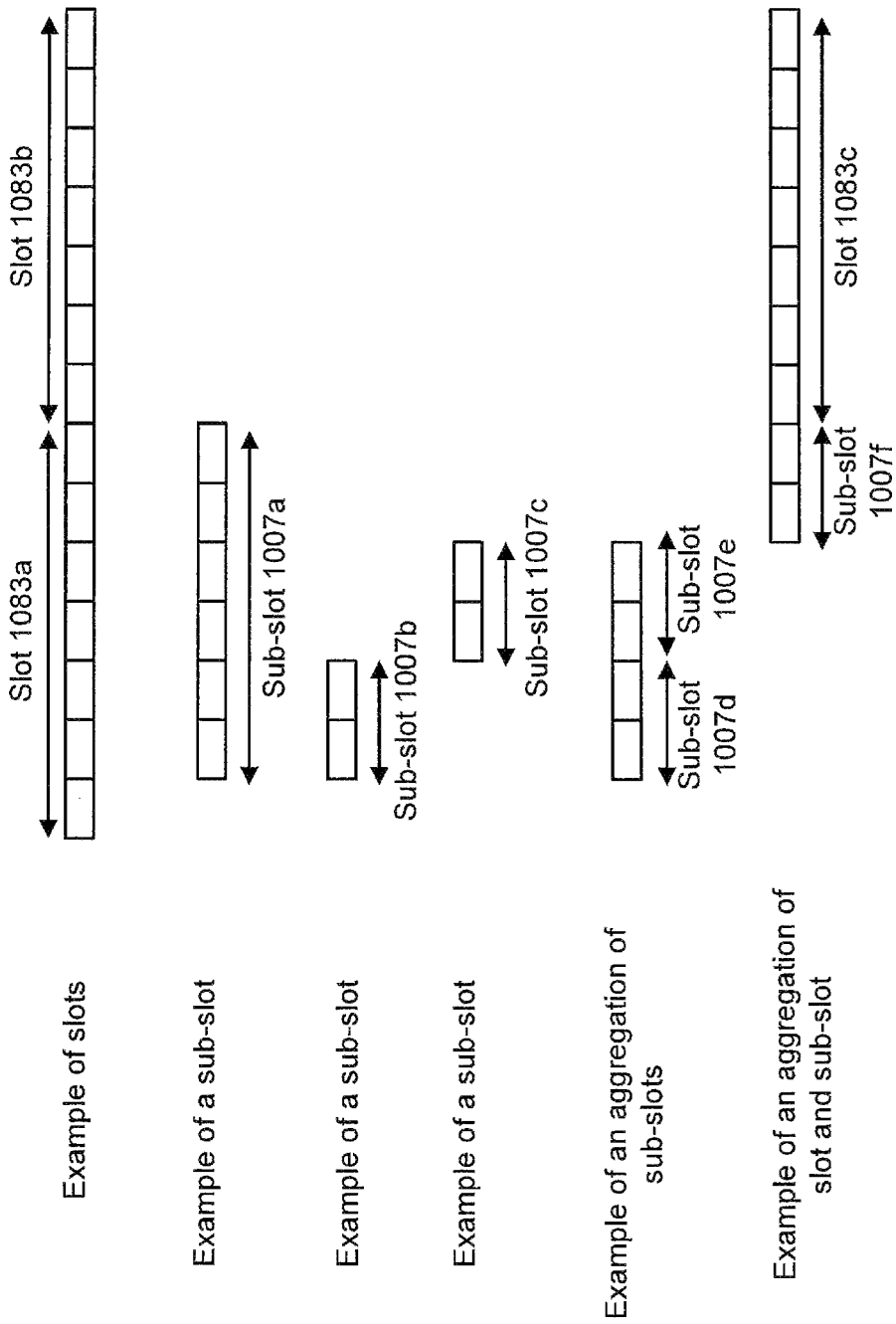
FIG. 10 shows examples of slots and sub-slots.

FIG. 10 shows examples of slots 1083 and sub-slots 1007. If a sub-slot 1007 is not configured by higher layer, the UE 102 and the eNB/gNB 160 may only use a slot 1083 as a scheduling unit. More specifically, a given transport block may be allocated to a slot 1083. If the sub-slot 1007 is configured by higher layer, the UE 102 and the eNB/gNB 160 may use the sub-slot 1007 as well as the slot 1083. The sub-slot 1007 may include one or more OFDM symbols. The maximum number of OFDM symbols that constitute the sub-slot 1007 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1007 may start at any symbol within a slot 1083 unless it collides with a control channel. There could be restrictions of mini-slot length based on restrictions on starting position. For example, the sub-slot 1007 with the length of $N^{DL}_{symb}-1$ (or $N^{UL}_{symb}-1$) may start at the second symbol in a slot 1083. The starting position of a sub-slot 1007 may be indicated by a physical layer control channel (e.g., by DCI format). Alternatively, the starting position of a sub-slot 1007 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1007.

In cases when the sub-slot 1007 is configured, a given transport block may be allocated to either a slot 1083, a sub-slot 1007, aggregated sub-slots 1007 or aggregated sub-slot(s) 1007 and slot 1083. This unit may also be a unit for HARQ-ACK bit generation.

Figure 11:
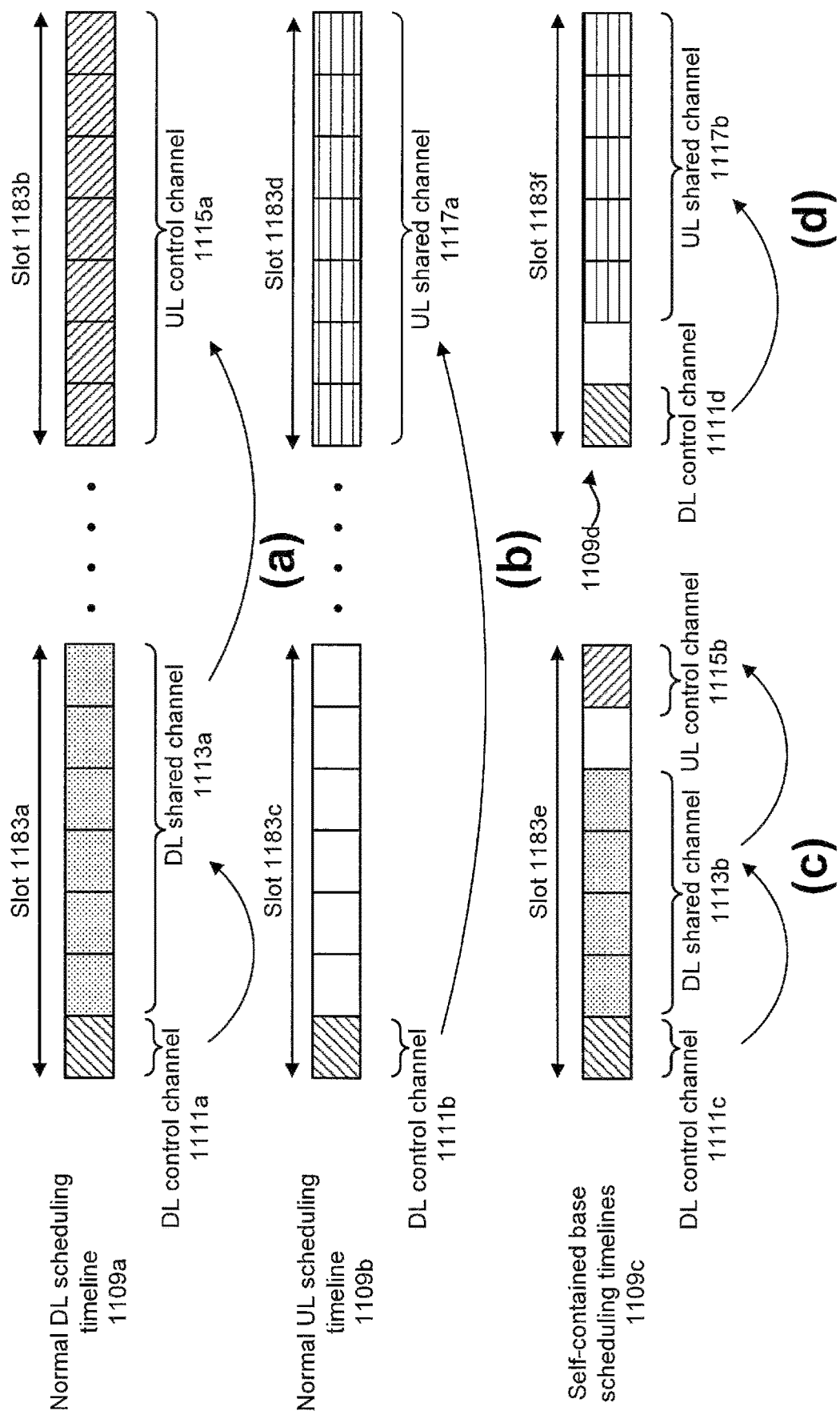
FIG. 11 shows examples of scheduling timelines.

FIG. 11 shows examples of scheduling timelines 1109. For a normal DL scheduling timeline 1109a, DL control channels are mapped the initial part of a slot 1183a. The DL control channels 1111 schedule DL shared channels 1113a in the same slot 1183a. HARQ-ACKs for the DL shared channels 1113a (i.e., HARQ-ACKs each of which indicates whether or not transport block in each DL shared channel 1113a is detected successfully) are reported via UL control channels 1115a in a later slot 1183b. In this instance, a given slot 1183 may contain either one of DL transmission and UL transmission.

For a normal UL scheduling timeline 1109b, DL control channels 1111b are mapped the initial part of a slot 1183c. The DL control channels 1111b schedule UL shared channels 1117a in a later slot 1183d. For these cases, the association timing (time shift) between the DL slot 1183c and the UL slot 1183d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1109c, DL control channels 1111c are mapped to the initial part of a slot 1183e. The DL control channels 1111c schedule DL shared channels 1113b in the same slot 1183e. HARQ-ACKs for the DL shared channels 1113b are reported in UL control channels 1115b, which are mapped at the ending part of the slot 1183e.

For a self-contained base UL scheduling timeline 1109d, DL control channels 1111d are mapped to the initial part of a slot 1183f. The DL control channels 1111d schedule UL shared channels 1117b in the same slot 1183f. For these cases, the slot 1183f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 12:
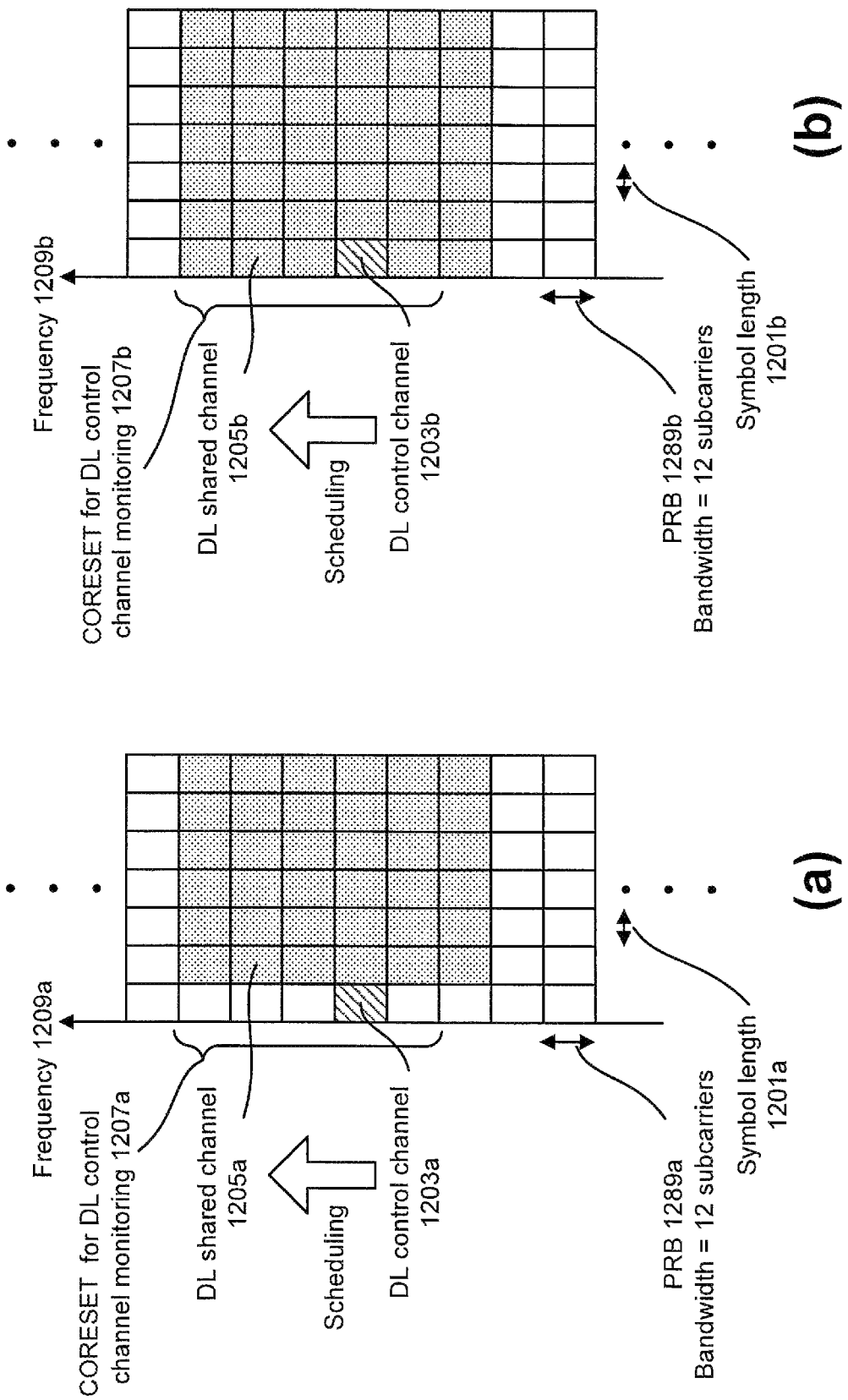
FIG. 12 shows examples of DL control channel monitoring regions.

FIG. 12 shows examples of DL control channel monitoring regions. In a first example (a), a physical resource block (PRB) 1289a is shown with a symbol length 1201a and frequency 1209a. In a second example (a), a physical resource block (PRB) 1289b is shown with a symbol length 1201b and frequency 1209b. In an implementation, the bandwidth of the PRB 1289a,b.

In the examples of FIG. 12, one or more sets of PRB(s) 1289 may be configured for DL control channel monitoring. In other words, a control resource set 1207a,b is, in the frequency domain, a set of PRBs 1289a,b within which the UE 102 attempts to blindly decode downlink control information, where the PRBs 1289a,b may or may not be frequency contiguous. A UE 102 may have one or more control resource sets 1207a,b, and one DCI message may be located within one control resource set 1207a,b. In the frequency-domain, a PRB 1289 is the resource unit size (which may or may not include Demodulation reference signals (DMRS)) for a control channel 1203a,b. A DL shared channel 1205a,b may start at a later OFDM symbol than the one(s) which carries the detected DL control channel 1203a,b. Alternatively, the DL shared channel 1205a,b may start at (or earlier than) an OFDM symbol than the last OFDM symbol which carries the detected DL control channel 1203a,b. In other words, dynamic reuse of at least part of resources in the control resource sets 1207a,b for data for the same or a different UE 102, at least in the frequency domain may be supported.

Figure 13:
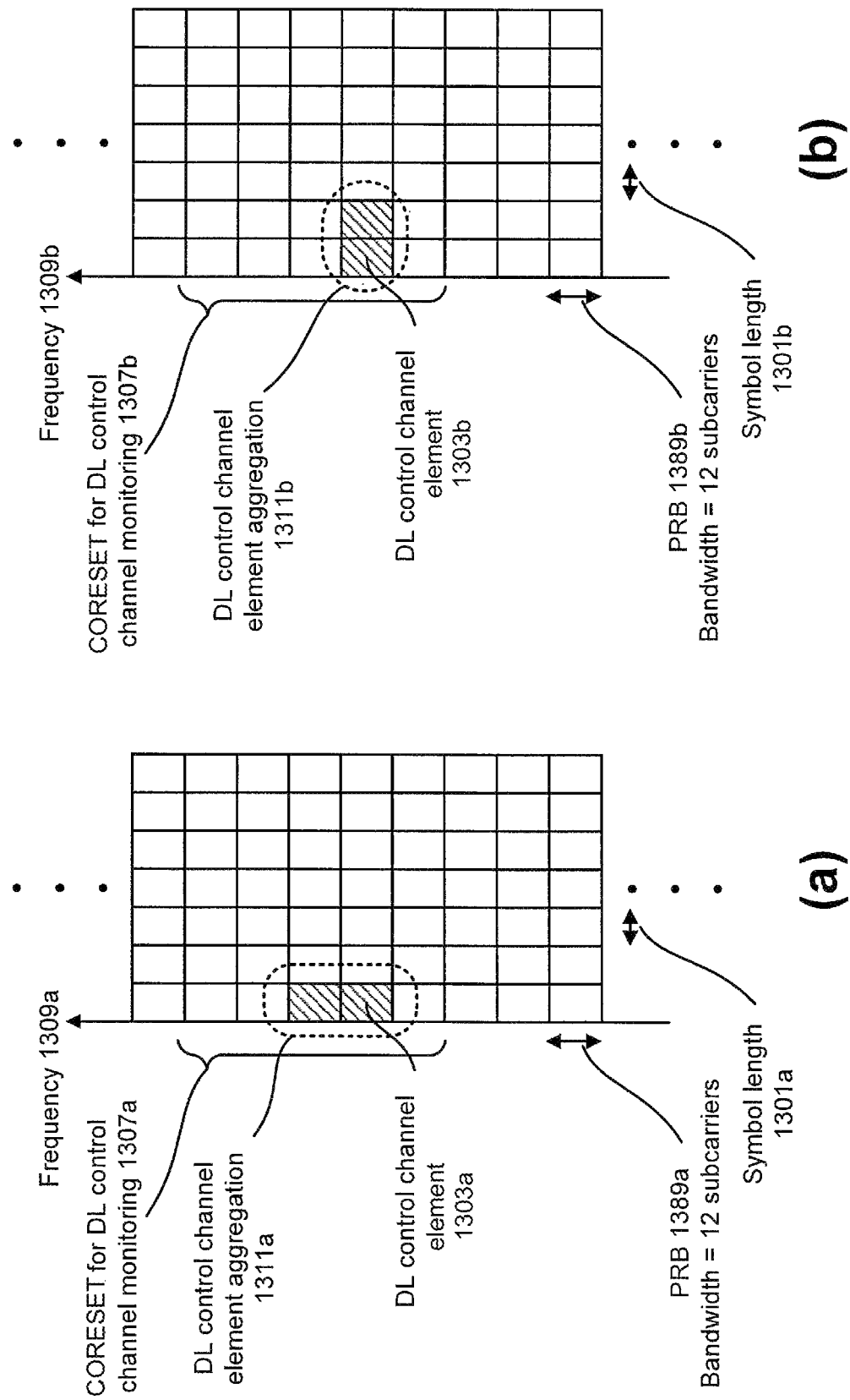
FIG. 13 shows examples of DL control channel which includes more than one control channel elements.

FIG. 13 shows examples of a DL control channel 1303a,b which includes more than one control channel elements. In a first example (a), a physical resource block (PRB) 1389a is shown with a symbol length 1301a and frequency 1309a. In a second example (a), a physical resource block (PRB) 1389b is shown with a symbol length 1301b and frequency 1309b.

When the control resource set 1307a,b spans multiple OFDM symbols, a control channel candidate may be mapped to multiple OFDM symbols or may be mapped to a single OFDM symbol. One DL control channel element 1303a,b may be mapped on REs defined by a single PRB 1389a,b and a single OFDM symbol. If more than one DL control channel elements 1303a,b are used for a single DL control channel transmission, DL control channel element aggregation 1311a,b may be performed.

The number of aggregated DL control channel elements 1303a,b is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set 1307a,b. If one DL control channel 1303a,b is mapped to a single OFDM symbol and does not span multiple OFDM symbols, the DL control channel element aggregation is performed within an OFDM symbol, namely multiple DL control channel elements 1303a,b within an OFDM symbol are aggregated. Otherwise, DL control channel elements 1303a,b in different OFDM symbols can be aggregated.

Figure 14:
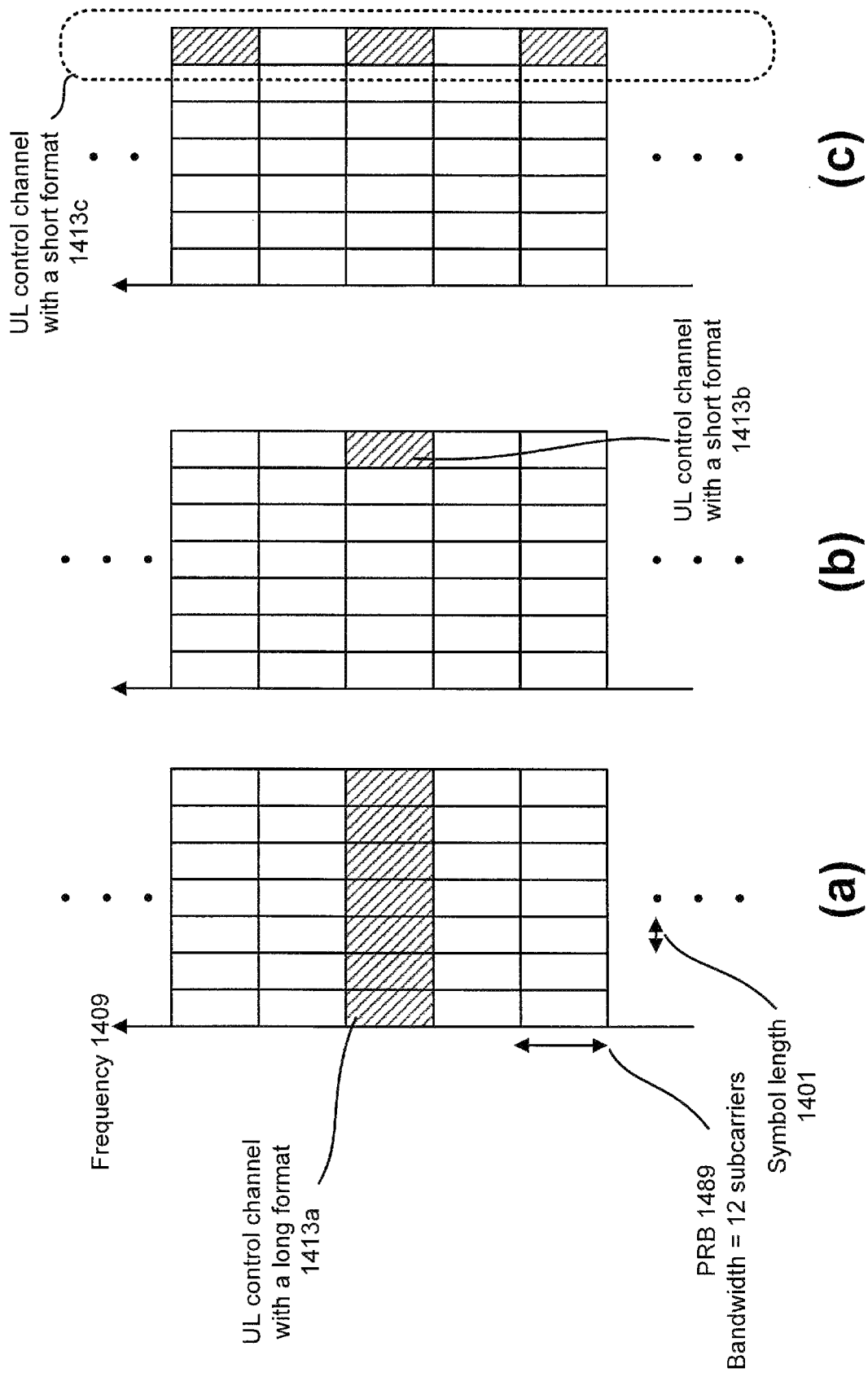
FIG. 14 shows examples of UL control channel structures.

FIG. 14 shows examples of UL control channel structures. In the examples of FIG. 14, physical resource blocks (PRBs) 1489 are shown with a symbol length 1401 and frequency 1409.

In a first example (a), the UL control channel 1413a may be mapped on REs which are defined by a PRB 1489 and a slot in frequency and time domains, respectively. This UL control channel 1413a may be referred to as a long format (or just the 1st format).

In the second example (b) and third example (c), UL control channels 1413b,c may be mapped on REs on a limited OFDM symbols in time domain. This may be referred to as a short format (or just the 2nd format). The UL control channels 1413b,c with a short format may be mapped on REs within a single PRB 1489. Alternatively, the UL control channels 1413b,c with a short format may be mapped on REs within multiple PRBs 1489. For example, interlaced mapping may be applied, namely the UL control channel 1413b,c may be mapped to every N PRBs (e.g., 5 or 10) within a system bandwidth.

Figure 15:
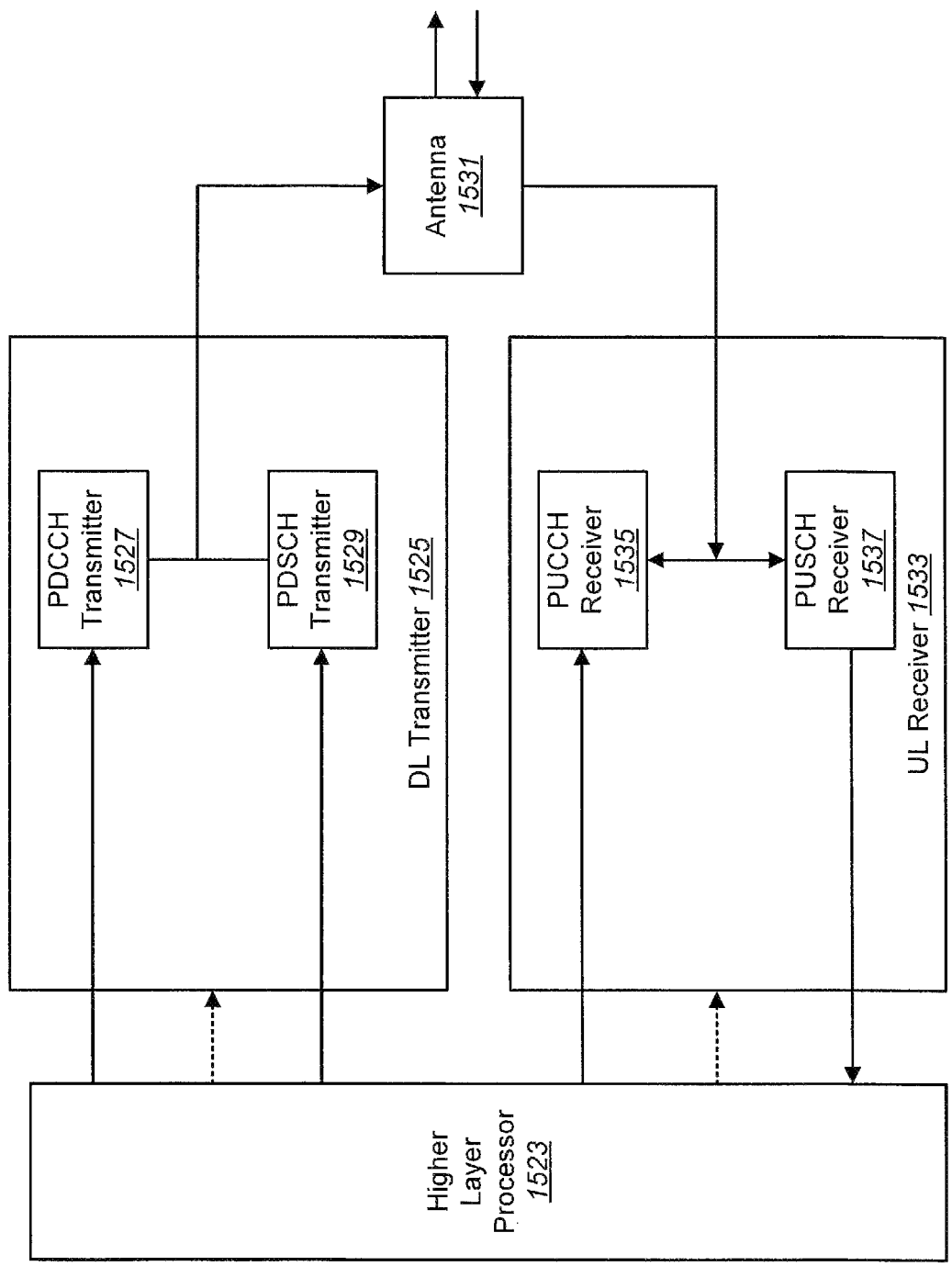
FIG. 15 is a block diagram illustrating one implementation of a gNB.

FIG. 15 is a block diagram illustrating one implementation of a gNB 1560. The gNB 1560 may include a higher layer processor 1523, a DL transmitter 1525, a UL receiver 1533, and one or more antenna 1531. The DL transmitter 1525 may include a PDCCH transmitter 1527 and a PDSCH transmitter 1529. The UL receiver 1533 may include a PUCCH receiver 1535 and a PUSCH receiver 1537.

The higher layer processor 1523 may manage physical layer's behaviors (the DL transmitter's and the UL receiver's behaviors) and provide higher layer parameters to the physical layer. The higher layer processor 1523 may obtain transport blocks from the physical layer. The higher layer processor 1523 may send/acquire higher layer messages such as an RRC message and MAC message to/from a UE's higher layer. The higher layer processor 1523 may provide the PDSCH transmitter transport blocks and provide the PDCCH transmitter transmission parameters related to the transport blocks.

The DL transmitter 1525 may multiplex downlink physical channels and downlink physical signals (including reservation signal) and transmit them via transmission antennas 1531. The UL receiver 1533 may receive multiplexed uplink physical channels and uplink physical signals via receiving antennas 1531 and de-multiplex them. The PUCCH receiver 1535 may provide the higher layer processor 1523 UCI. The PUSCH receiver 1537 may provide the higher layer processor 1523 received transport blocks.

Figure 16:
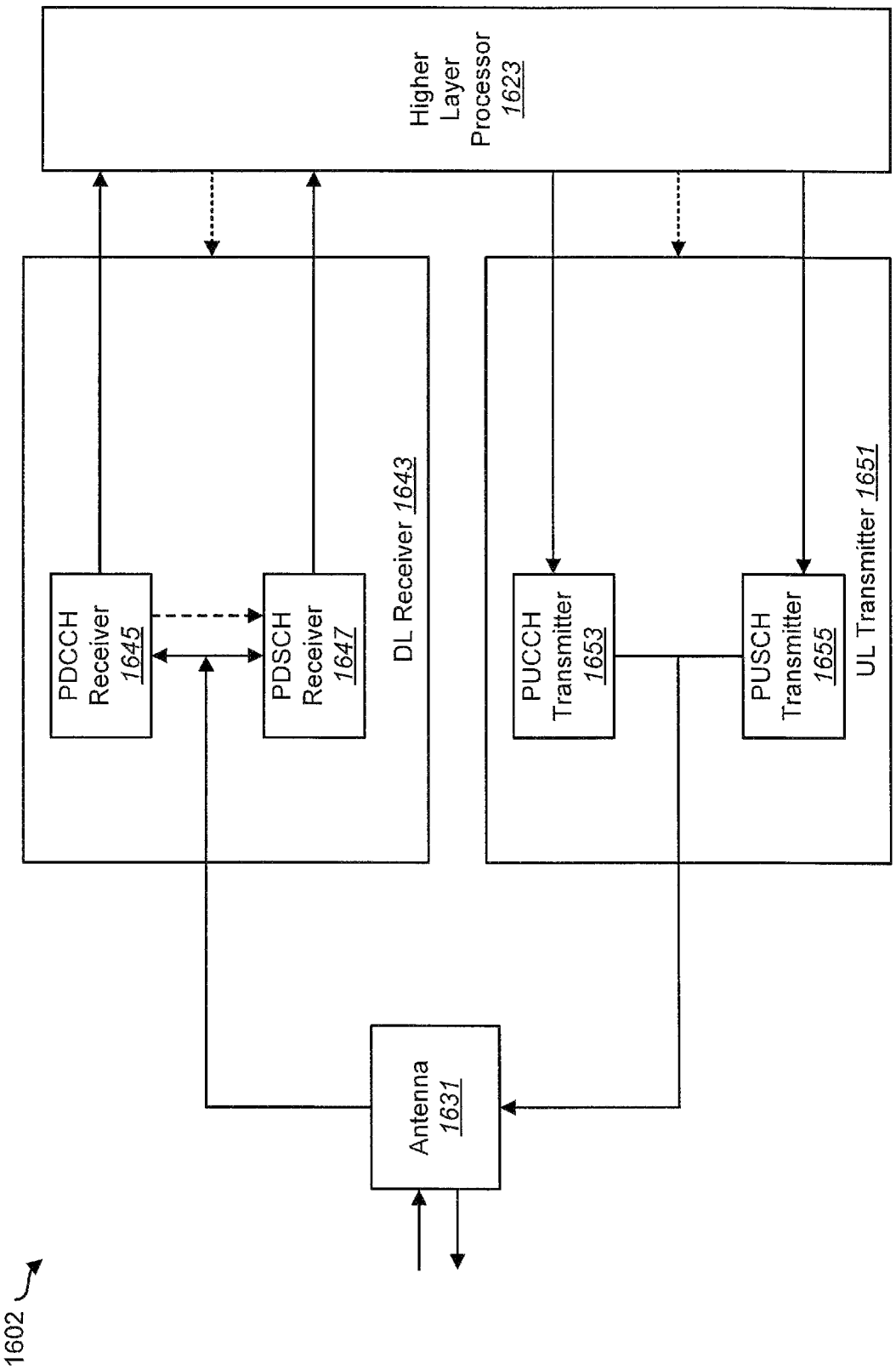
FIG. 16 is a block diagram illustrating one implementation of a UE.

FIG. 16 is a block diagram illustrating one implementation of a UE 1602. The UE 1602 may include a higher layer processor 1623, a UL transmitter 1651, a DL receiver 1643, and one or more antenna 1631. The UL transmitter 1651 may include a PUCCH transmitter 1653 and a PUSCH transmitter 1655. The DL receiver 1643 may include a PDCCH receiver 1645 and a PDSCH receiver 1647.

The higher layer processor 1623 may manage physical layer's behaviors (the UL transmitter's and the DL receiver's behaviors) and provide higher layer parameters to the physical layer. The higher layer processor 1623 may obtain transport blocks from the physical layer. The higher layer processor 1623 may send/acquire higher layer messages such as an RRC message and MAC message to/from a UE's higher layer. The higher layer processor 1623 may provide the PUSCH transmitter transport blocks and provide the PUCCH transmitter 1653 UCI.

The DL receiver 1643 may receive multiplexed downlink physical channels and downlink physical signals via receiving antennas 1631 and de-multiplex them. The PDCCH receiver 1645 may provide the higher layer processor 1623 DCI. The PDSCH receiver 1647 may provide the higher layer processor 1623 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 17:
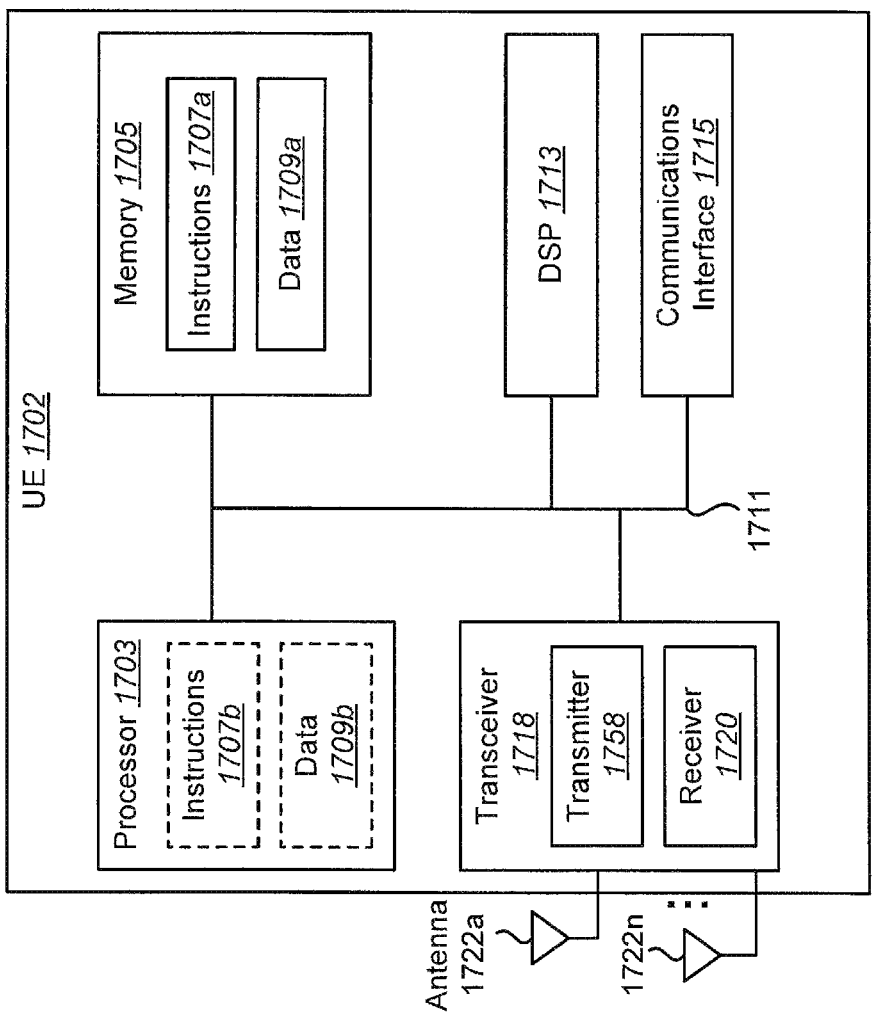
FIG. 17 illustrates various components that may be utilized in a UE.

FIG. 17 illustrates various components that may be utilized in a UE 1702. The UE 1702 described in connection with FIG. 17 may be implemented in accordance with the UE 102 described in connection with FIG. 1. The UE 1702 includes a processor 1703 that controls operation of the UE 1702. The processor 1703 may also be referred to as a central processing unit (CPU). Memory 1705, which may include read-only memory (ROM), random access memory (RAM), a combination of the two or any type of device that may store information, provides instructions 1707a and data 1709a to the processor 1703. A portion of the memory 1705 may also include non-volatile random-access memory (NVRAM). Instructions 1707b and data 1709b may also reside in the processor 1703. Instructions 1707b and/or data 1709b loaded into the processor 1703 may also include instructions 1707a and/or data 1709a from memory 1705 that were loaded for execution or processing by the processor 1703. The instructions 1707b may be executed by the processor 1703 to implement the methods described above.

The UE 1702 may also include a housing that contains one or more transmitters 1758 and one or more receivers 1720 to allow transmission and reception of data. The transmitter(s) 1758 and receiver(s) 1720 may be combined into one or more transceivers 1718. One or more antennas 1722a-n are attached to the housing and electrically coupled to the transceiver 1718.

The various components of the UE 1702 are coupled together by a bus system 1711, which may include a power bus, a control signal bus and a status signal bus, in addition to a data bus. However, for the sake of clarity, the various buses are illustrated in FIG. 17 as the bus system 1711. The UE 1702 may also include a digital signal processor (DSP) 1713 for use in processing signals. The UE 1702 may also include a communications interface 1715 that provides user access to the functions of the UE 1702. The UE 1702 illustrated in FIG. 17 is a functional block diagram rather than a listing of specific components.

Figure 18:
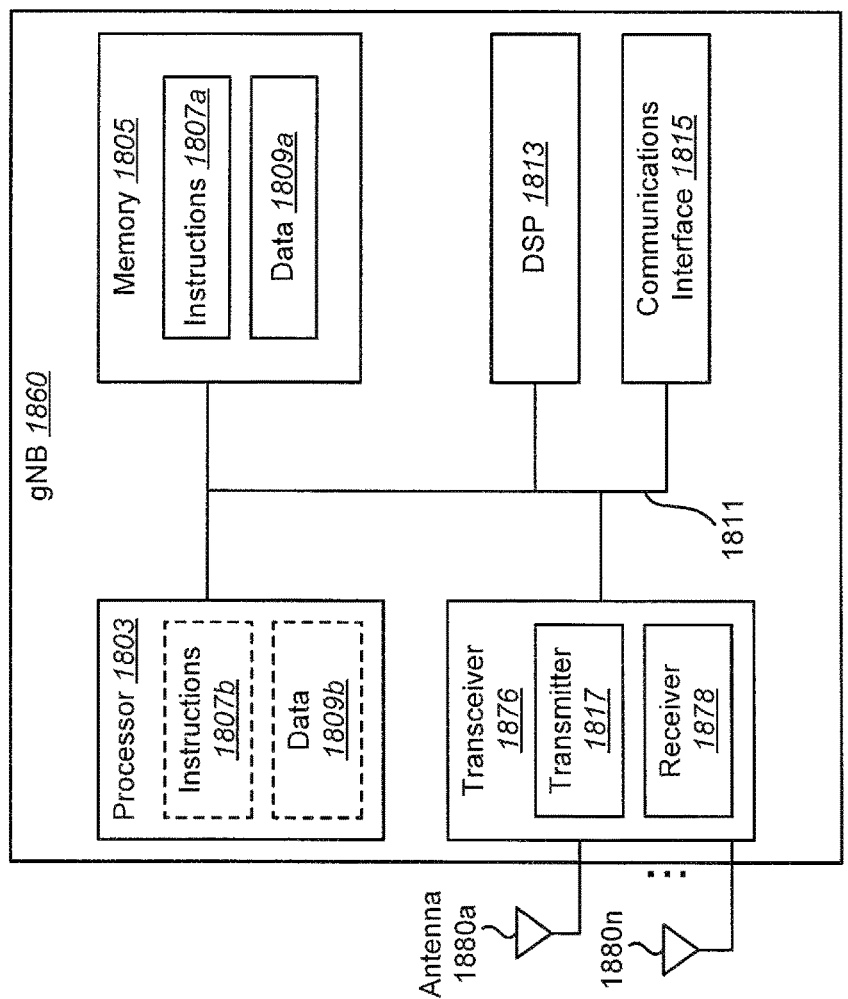
FIG. 18 illustrates various components that may be utilized in a gNB.

FIG. 18 illustrates various components that may be utilized in a gNB 1860. The gNB 1860 described in connection with FIG. 18 may be implemented in accordance with the gNB 160 described in connection with FIG. 1. The gNB 1860 includes a processor 1803 that controls operation of the gNB 1860. The processor 1803 may also be referred to as a central processing unit (CPU). Memory 1805, which may include read-only memory (ROM), random access memory (RAM), a combination of the two or any type of device that may store information, provides instructions 1807a and data 1809a to the processor 1803. A portion of the memory 1805 may also include non-volatile random-access memory (NVRAM). Instructions 1807b and data 1809b may also reside in the processor 1803. Instructions 1807b and/or data 1809b loaded into the processor 1803 may also include instructions 1807a and/or data 1809a from memory 1805 that were loaded for execution or processing by the processor 1803. The instructions 1807*b* may be executed by the processor 1803 to implement the methods described above.

The gNB 1860 may also include a housing that contains one or more transmitters 1817 and one or more receivers 1878 to allow transmission and reception of data. The transmitter(s) 1817 and receiver(s) 1878 may be combined into one or more transceivers 1876. One or more antennas 1880*a-n* are attached to the housing and electrically coupled to the transceiver 1876.

The various components of the gNB 1860 are coupled together by a bus system 1811, which may include a power bus, a control signal bus and a status signal bus, in addition to a data bus. However, for the sake of clarity, the various buses are illustrated in FIG. 18 as the bus system 1811. The gNB 1860 may also include a digital signal processor (DSP) 1813 for use in processing signals. The gNB 1860 may also include a communications interface 1815 that provides user access to the functions of the gNB 1860. The gNB 1860 illustrated in FIG. 18 is a functional block diagram rather than a listing of specific components.

Figure 19:
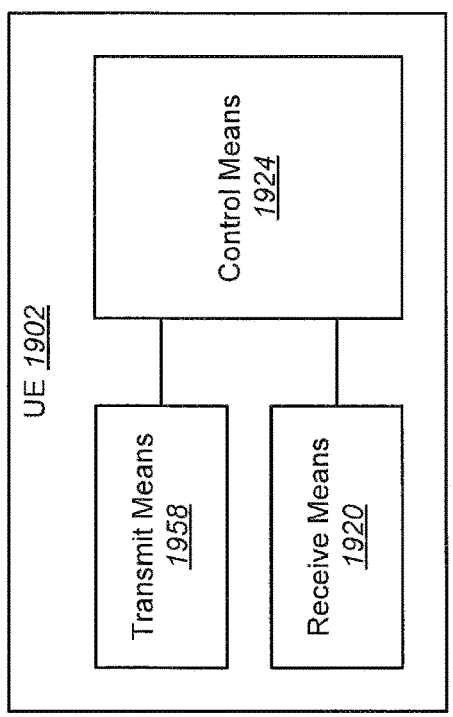
FIG. 19 is a block diagram illustrating one implementation of a UE in which the systems and methods described herein may be implemented.

FIG. 19 is a block diagram illustrating one implementation of a UE 1902 in which the systems and methods described herein may be implemented. The UE 1902 includes transmit means 1958, receive means 1920 and control means 1924. The transmit means 1958, receive means 1920 and control means 1924 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

Figure 20:
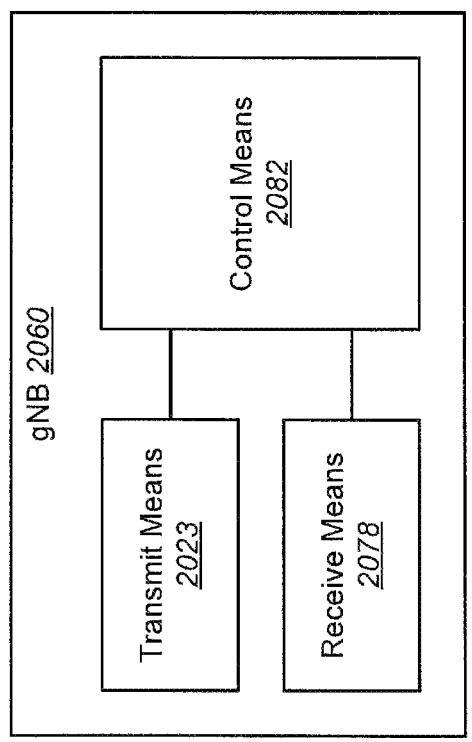
FIG. 20 is a block diagram illustrating one implementation of a gNB in which the systems and methods described herein may be implemented.

FIG. 20 is a block diagram illustrating one implementation of a gNB 2060 in which the systems and methods described herein may be implemented. The gNB 2060 includes transmit means 2023, receive means 2078 and control means 2082. The transmit means 2023, receive means 2078 and control means 2082 may be configured to perform one or more of the functions described in connection with FIG. 1 above. FIG. 18 above illustrates one example of a concrete apparatus structure of FIG. 20. Other various structures may be implemented to realize one or more of the functions of FIG. 1. For example, a DSP may be realized by software.

Figure 21:
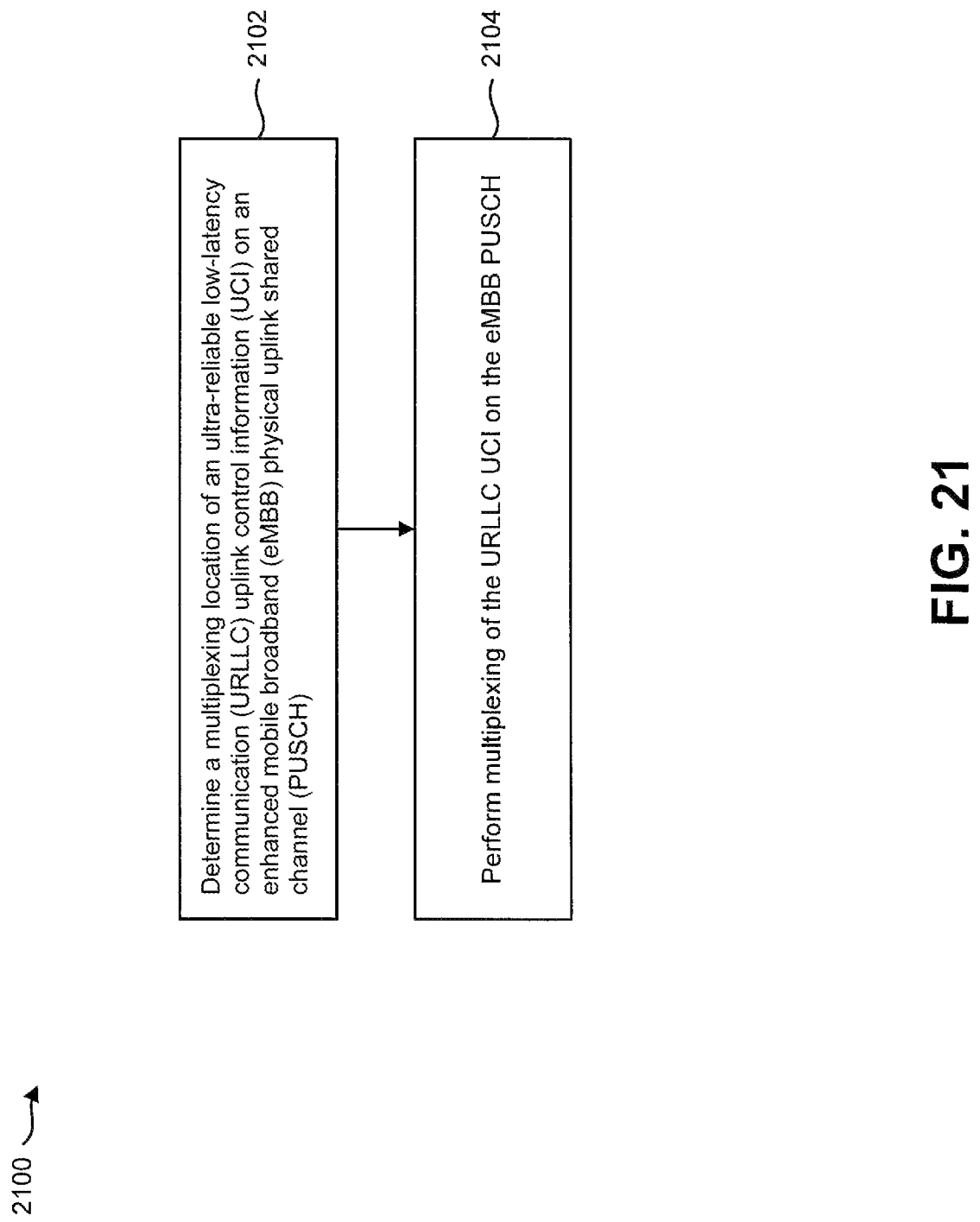
FIG. 21 is a flow diagram illustrating a communication method by a UE.

FIG. 21 is a flow diagram illustrating a communication method 2100 by a UE 102. The UE 102 may determine 2102 an ultra-reliable low-latency communication (URLLC) uplink control information (UCI) multiplexing location on an enhanced mobile broadband (eMBB) physical uplink shared channel (PUSCH). The UE 102 may perform 2104 multiplexing of the URLLC UCI on the eMBB PUSCH.

In an approach, the URLLC UCI multiplexing may start from a starting symbol in an overlapping region between the URLLC PUCCH and the eMBB PUSCH. In another approach, the URLLC UCI multiplexing may start from a starting symbol in an overlapping region between a sub-slot containing the URLLC PUCCH and the eMBB PUSCH.

If a demodulation reference signal (DMRS) symbol is contained in an overlapping region, then the URLLC UCI is not multiplexed on the DMRS. The URLLC UCI multiplexing may be limited within overlapping symbols. The URLLC UCI multiplexing may be extended beyond overlapping symbols. A delay tolerance may be specified to limit a feedback delay of the URLLC UCI.

In another approach, the URLLC UCI multiplexing starts only after a DMRS symbol. The URLLC UCI multiplexing may start after any DMRS(s) including additional DMRS(s), and the DMRS(s) may or may not be a first continuous set of DMRS in a slot or in a hop in the case of frequency hopping. The URLLC UCI multiplexing may be performed in one continuous set of symbols only. No UCI segmentation is performed. UCI multiplexing may be performed in only one hop even if frequency hopping is configured.

Figure 22:
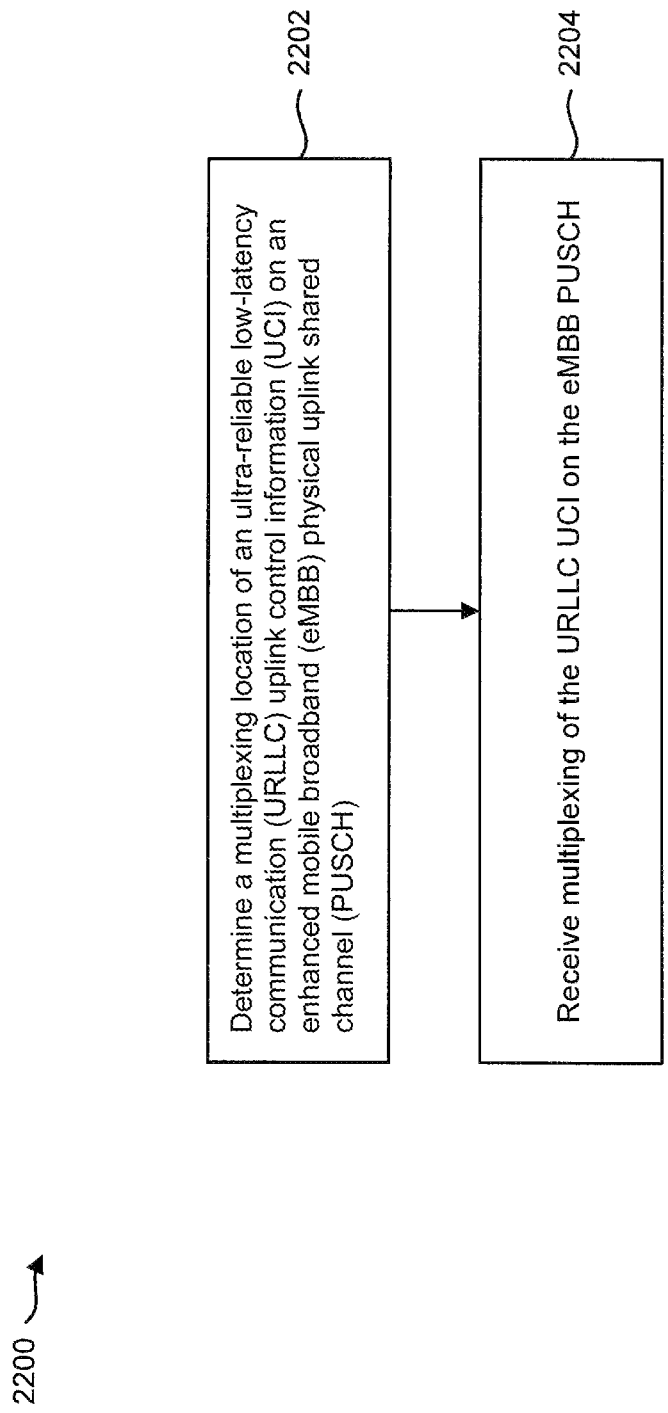
FIG. 22 is a flow diagram illustrating a communication method by a gNB.

FIG. 22 is a flow diagram illustrating a communication method 2200 by a gNB 160. The gNB 160 may determine 2202 an ultra-reliable low-latency communication (URLLC) uplink control information (UCI) multiplexing location on an enhanced mobile broadband (eMBB) physical uplink shared channel (PUSCH). The gNB 160 may receive 2204 multiplexing of the URLLC UCI on the eMBB PUSCH.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE), comprising:
a higher layer processor configured to determine a multiplexing location of an ultra-reliable low-latency communication (URLLC) uplink control information (UCI) on an enhanced mobile broadband (eMBB) physical uplink shared channel (PUSCH); and
transmitting circuitry configured to perform multiplexing of the URLLC UCI on the eMBB PUSCH,
wherein the multiplexing of the URLLC UCI is extended beyond overlapping symbols of an overlapping region between a URLLC physical uplink control channel (PUCCH) and the eMBB PUSCH.

2. The UE of claim 1, wherein the multiplexing of the URLLC UCI starts from a starting symbol in the overlapping region.

3. The UE of claim 1, wherein:
the overlapping region is between a sub-slot containing the URLLC PUCCH and the eMBB PUSCH, and
the multiplexing of the URLLC UCI starts from a starting symbol in the overlapping region.

4. The UE of claim 1, wherein the URLLC UCI is not multiplexed on a demodulation reference signal (DMRS) symbol when the DMRS is contained in the overlapping region.

5. The UE of claim 1, wherein the URLLC PUCCH corresponds to a high priority channel, and the eMBB PUSCH corresponds to a low priority channel.

6. The UE of claim 1, wherein a delay tolerance is specified to limit a feedback delay of the URLLC UCI.

7. The UE of claim 1, wherein the multiplexing of the URLLC UCI starts after a demodulation reference signal (DMRS) symbol.

8. The UE of claim 1, wherein the multiplexing of the URLLC UCI starts after one of a first continuous set of DMRSs and at least one additional DMRS, and the first continuous set of DMRSs is in a slot or in a hop in a case of frequency hopping.

9. The UE of claim 1, wherein;
the multiplexing of the URLLC UCI is performed in one continuous set of symbols,
no UCI segmentation is performed, and
UCI multiplexing is performed in one hop when frequency hopping is configured.

10. A base station (gNB), comprising:
a higher layer processor configured to determine a multiplexing location of an ultra-reliable low-latency communication (URLLC) uplink control information (UCI) on an enhanced mobile broadband (eMBB) physical uplink shared channel (PUSCH); and
receiving circuitry configured to receive multiplexing of the URLLC UCI on the eMBB PUSCH,
wherein the multiplexing of the URLLC UCI is extended beyond overlapping symbols of an overlapping region between a URLLC physical uplink control channel (PUCCH) and the eMBB PUSCH.

11. The gNB of claim 10, wherein the multiplexing of the URLLC UCI starts from a starting symbol in the overlapping region.

12. The gNB of claim 10, wherein:
the overlapping region is between a sub-slot containing the URLLC PUCCH and the eMBB PUSCH, and
the multiplexing of the URLLC UCI starts from a starting symbol in the overlapping region.

13. The gNB of claim 10, wherein the URLLC UCI is not multiplexed on a demodulation reference signal (DMRS) symbol when the DMRS is contained in the overlapping region.

14. The gNB of claim 10, wherein the URLLC PUCCH corresponds to a high priority channel, and the eMBB PUSCH corresponds to a low priority channel.

15. The gNB of claim 10, wherein a delay tolerance is specified to limit a feedback delay of the URLLC UCI.

16. The gNB of claim 10, wherein the multiplexing of the URLLC UCI starts after a demodulation reference signal (DMRS) symbol.

17. The gNB of claim 10, wherein the multiplexing of the URLLC UCI starts after one of a first continuous set of DMRSs and at least one additional DMRS, and the first continuous set of DMRSs is in a slot or in a hop in a case of frequency hopping.

18. The gNB of claim 10, wherein:
the multiplexing of the URLLC UCI is performed in one continuous set of symbols,
no UCI segmentation is performed, and
UCI multiplexing is performed in one hop when frequency hopping is configured.

* * * * *